(12) United States Patent
Goren et al.

(10) Patent No.: US 7,835,946 B2
(45) Date of Patent: Nov. 16, 2010

(54) INTERACTIVE CUSTOMER DISPLAY SYSTEM AND METHOD

(75) Inventors: Alon Goren, Fulton County, GA (US); Robert Scott Kingsfield, Fulton County, GA (US); Charles Howard Mallory, Fulton County, GA (US); Kristin Dohm Schoonover, Fulton County, GA (US); Brian Charles Cook, Fulton County, GA (US)

(73) Assignee: Radiant Systems, Inc., Alpharetta, GA (US)

( * ) Notice: Subject to any disclaimer, the term of this patent is extended or adjusted under 35 U.S.C. 154(b) by 1307 days.

(21) Appl. No.: 11/257,448

(22) Filed: Oct. 24, 2005

(65) Prior Publication Data

US 2008/0189172 A1 Aug. 7, 2008

Related U.S. Application Data

(60) Provisional application No. 60/621,600, filed on Oct. 22, 2004.

(51) Int. Cl.
*G06Q 30/00* (2006.01)
(52) U.S. Cl. .......................................... 705/26; 705/37
(58) Field of Classification Search ................... 705/26, 705/37
See application file for complete search history.

(56) References Cited

U.S. PATENT DOCUMENTS

| | | | |
|---|---|---|---|
| 5,353,219 A | 10/1994 | Mueller et al. | |
| 5,774,868 A | 6/1998 | Cragun et al. ................. | 705/10 |
| 6,055,513 A | 4/2000 | Katz et al. | |
| 6,119,099 A | 9/2000 | Walker et al. | |
| 6,223,163 B1 | 4/2001 | Van Luchene | |
| 6,317,835 B1 | 11/2001 | Bilger et al. | |
| 6,401,074 B1 | 6/2002 | Sleeper | |
| 6,529,879 B1 | 3/2003 | Hasegawa | |
| 6,598,024 B1 | 7/2003 | Walker et al. | |
| 6,634,550 B1 | 10/2003 | Walker et al. | |
| 6,694,300 B1 | 2/2004 | Walker et al. | |
| 6,810,385 B1 | 10/2004 | Brady et al. | |
| 7,603,332 B2 * | 10/2009 | Hogan .......................... | 706/47 |
| 2002/0046124 A1 | 4/2002 | Alderucci et al. | |
| 2002/0077960 A1 | 6/2002 | Kiely et al. | |
| 2002/0184104 A1 | 12/2002 | Littman | |
| 2003/0018513 A1 | 1/2003 | Hoffman et al. | |

(Continued)

OTHER PUBLICATIONS

Turning the tables on service: Operators install self-serve terminals and kiosks, Ed Rubinstein. Nation's Restaurant News. New York: Sep. 14, 1998. vol. 32, Iss. 37; p. 99, 1 pgs, downloaded from ProQuest Direct on the Internet on Nov. 7, 2009, 5 pages.*

(Continued)

*Primary Examiner*—James Zurita
(74) *Attorney, Agent, or Firm*—Ballard Spahr LLP

(57) ABSTRACT

The present invention relates generally to systems, methods, and computer program products which facilitate consumer ordering. The present invention facilitates consumer ordering through the use of Express Orders for the creation of orders based on one or more past orders. The present invention also facilitates consumer ordering through use of Preferred Orders, which allow a consumer to define and store orders for later use. Ordering is also facilitated by suggesting order items to a consumer based on previously ordered items, as well as by providing an interactive customer display.

23 Claims, 20 Drawing Sheets

Express Order

U.S. PATENT DOCUMENTS

2003/0163388 A1     8/2003   Beane
2004/0158494 A1*   8/2004   Suthar .......................... 705/15

OTHER PUBLICATIONS

Extended European Search Report and Written Opinion for EP 05812895.0 Issued Jun. 5, 2009.
Notice from the European Patent Office dated Oct. 1, 2007 concerning business methods.
*Interactive POS video yields instant results; Vision System collects data, produces coupons and cash refunds*; Chain Store Age Executive with Shopping Center Age; Lebhar-Friedman Inc.; vol. 64, No. 9; p. 52(3); 1988.
Allure™ Products Order Confirmation Board (web page); http://www.alurefm.com/product_order.htm (Oct. 28, 2004).
The Source . . . The Solution (web page) http://www.erconline.com/OCU.htm (Oct. 28, 2004).
New Realm Technologies web page; http://www.new-realm.com/captiview.ocd.htm (Oct. 28, 2004).
PCS System Series web page; http://www.hei-sei.com/product/pos.htm (Oct. 28, 2004).
Business Microvar, Inc. web page; http://www.businessmicrovar-pos.com/POS_features.htm (Oct. 28, 2004).
LRS Kiosk (web page); http://www.pager.net/htdocs/kiosk.html (Oct. 28, 2004).
Liddle, Alan J.; *Vendor: Digital Deal persuades guests to spend more*; Nation's Restaurant News; Lebhar-Friedman Inc.; Nov. 27, 2000.
Odyssey Software Suite—Everything POSsible (web page); www.comtrex.com.
Zimmerman, Denise; *Shop 'N Bag has POS in the Bag*; Supermarket News; vol. 45, No. 20; p. 24(1); May 15, 1995.
Stores Automated Systems Inc.; *Promotion system marries video and POS; SASI's two screen system is less sophisticated, but less expensive*; Chain Store Age Executive with Shopping Center Age; Lebhar-Friedman Inc.; vol. 64, No. 9; p. 56(1); Sep. 1988.
Amato-McCoy, Deena M.; *Multimedia signage—kicked up a notch!*; Trend Publishing, Inc.; vol. 68; Iss. 10; p. 34(1); 2002.
Stores Automated Systems, Inc.; *Promotion system marries video and POS*; Chain Store Age Executive with Shopping Center Age; Lebhar-Friedman Inc.; vol. 64, No. 9; p. 56(1); 1988.
Checkrobot; *DIY promos via video POS*; Chain Store Age Executive with Shopping Center Age; Lebhar-Friedman Inc.; vol. 64, No. 4; p. 76(2); 1988.
McClure, Barry H.; *What are the hot buttons in produce department POS?*; Supermarket Business; vol. 47, No. 1; p. 25(2); 1992.
Examiner's First Report for Australian Patent Application No. 2005299348 dated Mar. 4, 2010.
International Search Report.

* cited by examiner

Exemplary Digital Device

Express Order

Preferred Order

Express Item

INTERACTIVE CUSTOMER DISPLAY SYSTEM AND METHOD

CROSS-REFERENCE TO RELATED PATENT APPLICATIONS

This application claims priority under 35 U.S.C. §119 to U.S. Provisional Patent Application Ser. No. 60/621,600, entitled "Interactive Customer Display System and Method" filed on Oct. 22, 2004, which is herein incorporated by reference in its entirety.

TECHNICAL FIELD OF THE INVENTION

The present invention relates generally to systems, methods, and computer program products which facilitate consumer ordering. The present invention facilitates consumer ordering through the use of Express Orders for the creation of orders based on one or more past orders. The present invention also facilitates consumer ordering through use of Preferred Orders, which allow a consumer to define and store orders for later use. Ordering is also facilitated by suggesting order items to a consumer based on previously ordered items, as well as by providing an interactive customer display.

BACKGROUND

The restaurant industry is an increasingly competitive market. Owners are looking for ways to retain repeat loyal customers and increase customer visits. Most food establishments have a set menu and repeat customers tend to have their set of favorite items that they continually order from on each visit. Additionally, when a customer orders an item a certain way, they will order it that way most if not all of the time. For example, someone who does not like onions will always order their entrees with no onions.

Today, customers visit a restaurant, read through the menu and verbally tell an employee what they would like. On each visit the repeat customer must still read the menu to remember exactly what the item is called or its ordering number. They must also continue to tell employees how they like it on every visit. High employee turnover is a problem for most food stores, as well as serving customers as quickly as possible. Under these conditions, employees are not able to recognize loyal, repeat customers, remember their favorite orders, and provide a high level of service to these valuable customers. Even when a visitor to a restaurant is able successfully communicate an order, the order is often not accurately communicated to food preparers, resulting in an erroneous order, a frustrated customer, and a loss for the restaurant, which often must discard the first order and prepare the consumer's order a second time.

These deficiencies, while discussed in the context of the food industry, exist in various industries where consumers periodically order items from the same vendor, and particularly where the consumer often places the same or similar orders with a given vendor.

Several methods are needed to remedy theses deficiencies in the art. First, what is needed is a method to facilitate consumer ordering by creating a current order for a consumer based on one or more past orders associated with the consumer. Likewise, there is a need for a method to facilitate ordering by suggesting order items based on a consumer's past order history. There is also a need for a method which allows a consumer to define and name one or more preferred orders, enabling efficient and personalized product ordering.

Finally, there is a need for an interactive system which provides a platform for the various methods useful to remedy deficiencies in the art.

SUMMARY OF THE INVENTION

The present invention provides methods, systems, and computer program products which facilitate the consumer ordering process to the benefit of both the consumer and the vendor. In one embodiment of the present invention, a method is provided to facilitate consumer ordering through the use of an Express Order, which comprises the steps of identifying a consumer, retrieving past orders associated with the consumer, and creating a current order based on one or more past orders. The terms Express Order, Express Order Module, and Express Order State may be used interchangeably in the present invention. An Express Order can also be used to create a current order both by, and on behalf of, a consumer, to communicate the order to the consumer, to generate an order menu for the consumer, as well as other uses.

In another embodiment of the present invention, a method is provided to facilitate consumer ordering through the use of Preferred Orders, which allow a consumer to create, name, rank, and store one or more orders as Preferred Orders. Using Preferred Orders, the consumer may be subsequently presented with a personalized and ranked list of orders defined and named exactly as the consumer desires. A Preferred Order in a further embodiment can be based on one or more prior orders associated with the consumer, as well as created by simulating the order process for a consumer using a digital device and storing the resulting order as a Preferred Order associated with the consumer.

An Interactive Customer Display (ICD) system is also provided which enables a consumer to conveniently and efficiently place orders using one or more of the methods described above, providing enhanced consumer interaction and ordering.

Other goals, features, and advantages of the present invention will become apparent upon reviewing the following detailed description of the preferred embodiments of the invention, when taken in conjunction with the drawings and the appended claims.

BRIEF DESCRIPTION OF THE DRAWINGS

The accompanying drawings, which are incorporated in and constitute part of this specification, illustrate embodiments of the invention, and together with the description, serve to explain the principles of the invention. The embodiments described in the drawings and specification in no way limit or define the scope of the present invention.

DETAILED DESCRIPTION

Before the present methods, systems, and computer program products are disclosed and described, it is to be understood that this invention is not limited to specific methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders, reference to "an encoder" includes mixtures of two or more such encoders, and the like.

Figure 14:
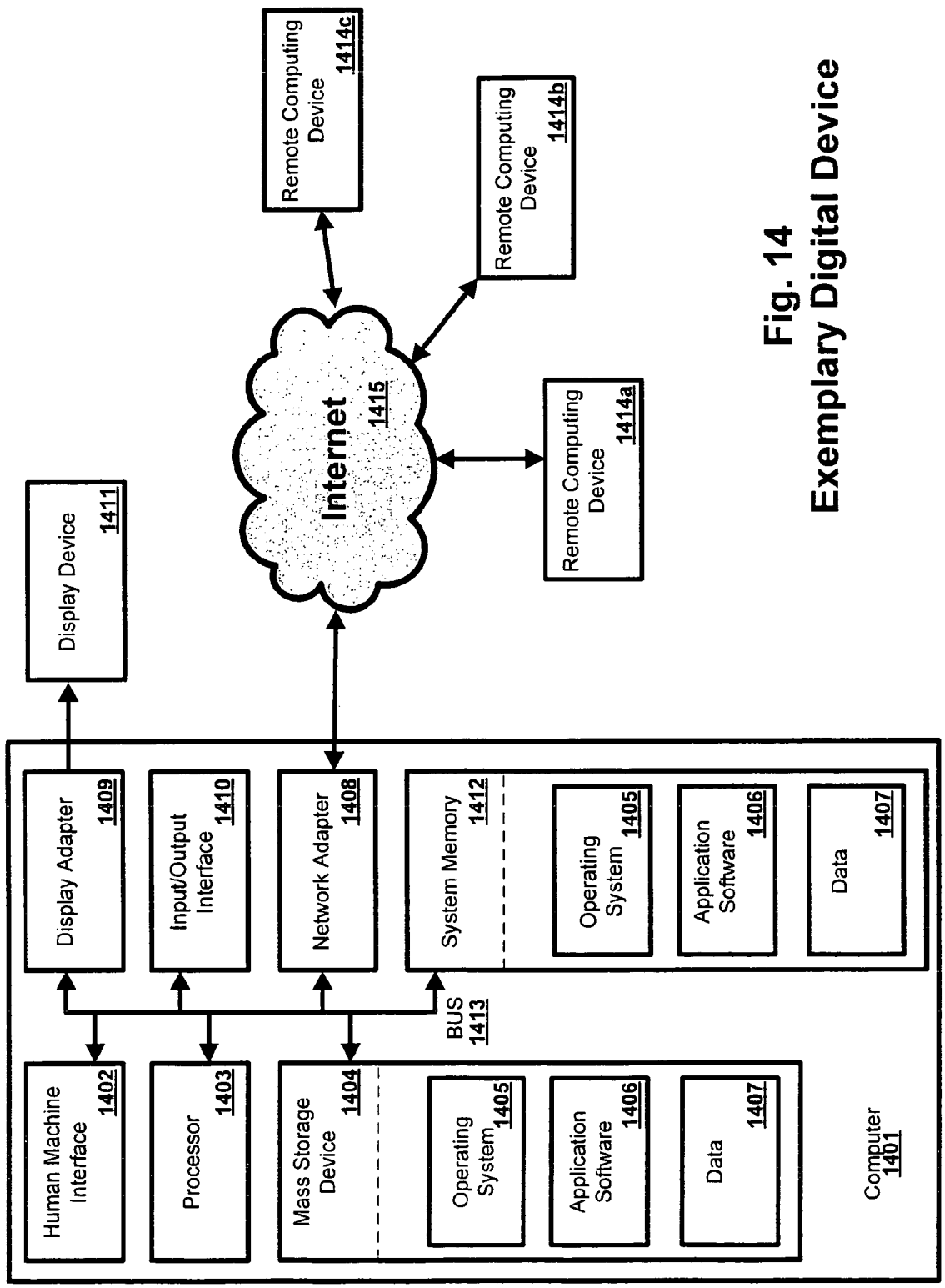
FIG. 14 shows a logical overview of a digital device which may be used to carry out the various embodiments of the present invention.

The system, method, and computer program product of the present invention, collectively referred to herein as the "method" or "methods" of the present invention, can be carried out using a processor programmed to carry out the various embodiments of the present invention. FIG. 14 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the method include, but are not limited to, personal computers, server computers, laptop devices, and multiprocessor systems. Additional examples include set top boxes, programmable consumer electronics, network PCs, minicomputers, mainframe computers, distributed computing environments that include any of the above systems or devices, and the like.

The method may be described in the general context of computer instructions, such as program modules, being executed by a computer. Generally, program modules include routines, programs, objects, components, data structures, etc. that perform particular tasks or implement particular abstract data types. The method may also be practiced in distributed computing environments where tasks are performed by remote processing devices that are linked through a communications network. In a distributed computing environment, program modules may be located in both local and remote computer storage media including memory storage devices.

The method disclosed herein can be implemented via a general-purpose computing device in the form of a computer 1401. The components of the computer 1401 can include, but are not limited to, one or more processors or processing units 1403, a system memory 1412, and a system bus 1413 that couples various system components including the processor 1403 to the system memory 1412.

The processor 1403 in FIG. 14 can be an x-86 compatible processor, including a PENTIUM IV, manufactured by Intel Corporation, or an ATHLON 64 processor, manufactured by Advanced Micro Devices Corporation. Processors utilizing other instruction sets may also be used, including those manufactured by Apple, IBM, or NEC.

The system bus 1413 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection. The bus 1413, and all buses specified in this description can also be implemented over a wired or wireless network connection and each of the subsystems, including the processor 1403, a mass storage device 1404, an operating system 1405, application software 1406, data 1407, a network adapter 1408, system memory 1412, an Input/Output Interface 1410, a display adapter 1409, a display device 1411, and a human machine interface 1402, can be contained within one or more remote computing devices 1414a,b,c at physically separate locations, connected through buses of this form, in effect implementing a fully distributed system.

The operating system 1405 in FIG. 14 includes operating systems such as MICROSOFT WINDOWS XP, WINDOWS 2000, WINDOWS NT, or WINDOWS 98, and REDHAT LINUX, FREE BSD, or SUN MICROSYSTEMS SOLARIS. Additionally, the application software 1406 may include web browsing software, such as MICROSOFT INTERNET EXPLORER or MOZILLA FIREFOX, enabling a user to view HTML, SGML, XML, or any other suitably constructed document language on the display device 1411.

The computer 1401 typically includes a variety of computer readable media. Such media can be any available media that is accessible by the computer 1401 and includes both volatile and non-volatile media, removable and non-removable media. The system memory 1412 includes computer readable media in the form of volatile memory, such as random access memory (RAM), and/or non-volatile memory, such as read only memory (ROM). The system memory 1412 typically contains data such as data 1407 and and/or program modules such as operating system 1405 and application software 1406 that are immediately accessible to and/or are presently operated on by the processing unit 1403.

The computer 1401 may also include other removable/non-removable, volatile/non-volatile computer storage media. By way of example, FIG. 14 illustrates a mass storage device 1404 which can provide non-volatile storage of computer code, computer readable instructions, data structures, program modules, and other data for the computer 1401. For example, a mass storage device 1404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 1404, including by way of example, an operating system 1405 and application software 1406. Each of the operating system 1405 and application software 1406 (or some combination thereof) may include elements of the programming and the application software 1406. Data 1407 can also be stored on the mass storage device 1404. Data 1404 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 1401 via an input device (not shown). Examples of such input devices include, but are not limited to, a keyboard, pointing device (e.g., a "mouse"), a microphone, a joystick, a serial port, a scanner, touch screen mechanisms, and the like. These and other input devices can be connected to the processing unit 1403 via a human machine interface 1402 that is coupled to the system bus 1413, but may be connected by other interface and bus structures, such as a parallel port, serial port, game port, or a universal serial bus (USB).

A display device 1411 can also be connected to the system bus 1413 via an interface, such as a display adapter 1409. For example, a display device can be a cathode ray tube (CRT) monitor or an Liquid Crystal Display (LCD). In addition to the display device 1411, other output peripheral devices can include components such as speakers (not shown) and a printer (not shown) which can be connected to the computer 1401 via Input/Output Interface 1410.

The computer 1401 can operate in a networked environment using logical connections to one or more remote computing devices 1414*a,b,c*. By way of example, a remote computing device can be a personal computer, portable computer, a server, a router, a network computer, a peer device or other common network node, and so on. Logical connections between the computer 1401 and a remote computing device 1414*a,b,c* can be made via a local area network (LAN) and a general wide area network (WAN). Such network connections can be through a network adapter 1408. A network adapter 1408 can be implemented in both wired and wireless environments. Such networking environments are commonplace in offices, enterprise-wide computer networks, intranets, and the Internet 1415.

For purposes of illustration, application programs and other executable program components such as the operating system 1405 are illustrated herein as discrete blocks, although it is recognized that such programs and components reside at various times in different storage components of the computing device 1401, and are executed by the data processor(s) of the computer. An implementation of application software 1406 may be stored on or transmitted across some form of computer readable media. An implementation of the disclosed method may also be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 18:
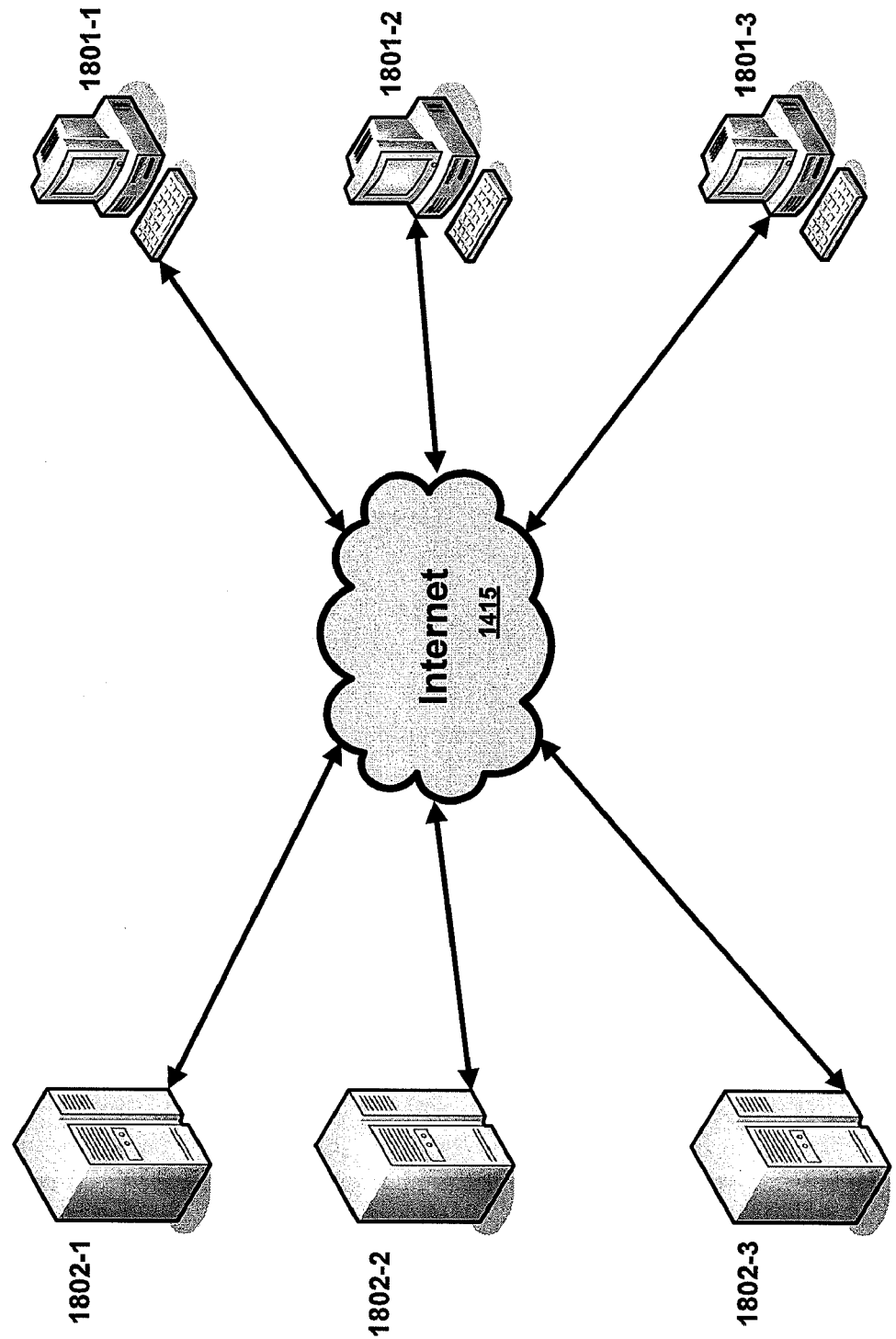
FIG. 18 illustrates the arrangement of computers connected to the Internet in one embodiment of the present invention.

FIG. 18 illustrates a logical overview of the Internet 1415 of one embodiment of the present invention. One or more client computers 1801, for example, such as the remote computing devices 1414*a,b,c* depicted in FIG. 14, may be connected to the Internet 1415 as depicted at 1801-1, 1801-2, and 1801-3. Additionally, one or more computers 1802-1, 1802-2, and 1802-3 of the type depicted at 1401 may act as servers, providing web pages via HTTP request, database access, remote terminal services, digital file download or upload, or any other desired service. Furthermore, one or more client computers, such as 1801-1, may act as an Internet accessible server computer 1802-1, and vice versa.

It will be apparent to those skilled in the art that various digital devices may be used to carry out the systems, methods, and computer program products of the present invention, such as a self service station, kiosk, point of sale terminal, interactive customer display, personal computer, set top box, personal digital assistant, cell phone, or dedicated hardware devices designed specifically to carry out the methods of the present invention. Furthermore, while various embodiments provided in the current application refer to the statutory classes of methods, systems, or computer program products, it should be noted that the present invention may be carried out, embodied, or claimed in any statutory class.

Unless otherwise expressly stated, it is in no way intended that any method or embodiment set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

Interactive Customer Display

Figure 19:
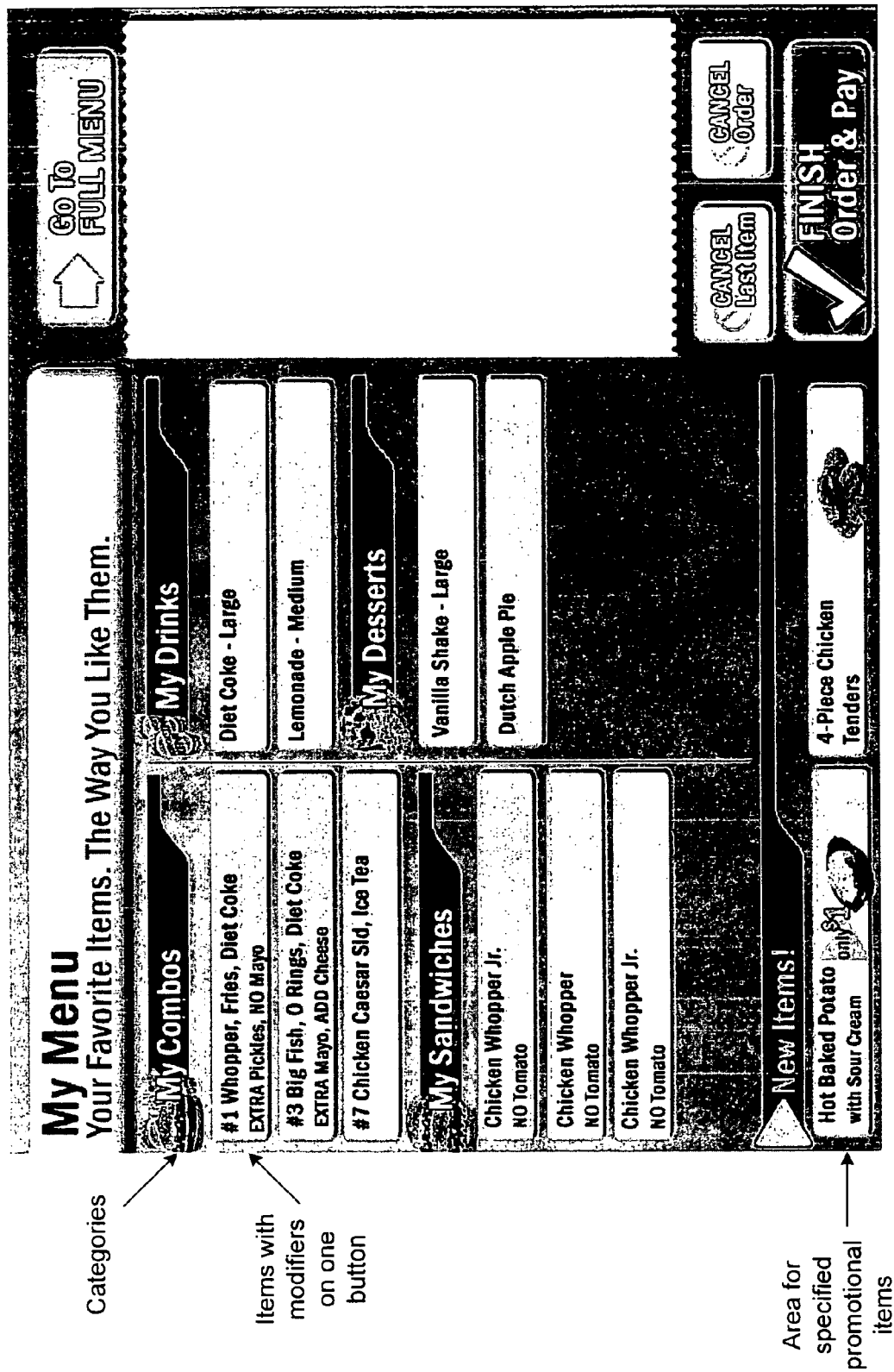
FIG. 19 is an exemplary display for the ICD illustrating orders, items, and modifiers.

In one embodiment, the system of the present invention is drawn to an Interactive Customer Display (ICD) which consists of a touch screen display connected to the back of a point of sale (POS) terminal. In one embodiment the ICD consists of a 12" 1024×768 or 800×600 resolution touch display that faces the customer and a 15" 1024×768 resolution touch display facing the cashier, contains one Magnetic Stripe Reader (MSR) connected to the ICD and one MSR connected to the POS terminal, is Radio Frequency Identification (RFID) and Biometric ready, contains dual receipt printers, is field upgradeable, and will function with the Radiant Systems P1550 or P1510 POS terminals with an added video card. In another embodiment of the present invention a 10.4" display operating at a resolution of 1024×768 or 800×600 may also be used. The Radiant Systems POS terminals are available from Radiant Systems, Inc., Alpharetta, Ga. The ICD system can also be carried out on any one of the digital devices described above, such as the device of FIG. 14. FIG. 19 illustrates an exemplary display for the ICD illustrating orders, items and modifiers.

The ICD system consist of one or more independent functional components which are assembled together to provide the ICD functionality. The components include the User Interface Engine, Event Handling Engine, User Interface Configuration Tool, Logging Module, Express Order Module, Promotions Module, Upsell Module, and Loyalty Module. One or more components may be deployed on an ICD system. In one embodiment, each ICD module may enter one or more ICD States.

An ICD State represents the different functionalities that can be presented to a user, with each state comprising information, display rules, and logic. Each ICD terminal can be configured to run any combination of these states. Several states exists which can be executed alone, or in combination, on the ICD. In a first embodiment, an Attract State is provided, which takes up the full screen and rotates a series of graphics, animations or full motion video (FMV) promotions. The Attract State may be the default state for the ICD and may run continually until overridden by another state. When returning to this state from another state, the Attract State can randomly pick a starting point for displaying promotions, so that the same promotions are not played repeatedly.

In a second embodiment, an End of Order State is provided, which displays an image or animation when the order is tendered, and may be used to thank the customer or provide additional instructions such as where to pick-up their order. The End of Order State can override other states when the order is tendered. The End of Order State can display end of order information for a configurable amount of time, after which the ICD may return to the Attract State and play the attract playlist, which defines a list of promotional information to be displayed.

In a third embodiment, a Promotions State is provided which takes up left ⅓ of the screen and rotates a series of graphics, animations or FMV. The Receipt State comprises a set of configuration options for the order confirmation receipt area, and can display the contents of the current order in the right ⅔ of the screen. Options include background graphic, whether or not to display prices, and whether or not to display subtotal, tax, total or change. If selected, the Promotions State can override the Attract State once a new order is initiated, and end when the order is completed. Further, the Promotions State can randomly pick a starting point for displaying promotions, so that promotions do not end up being played over and over again.

The present invention in one embodiment provides an Upsell State, which may be automatically displayed when an event (such as selling a particular item) that triggers the order upsell occurs. The Upsell State can cover up the in-order playlist, and may override other states, including the Attract State.

Figure 13:
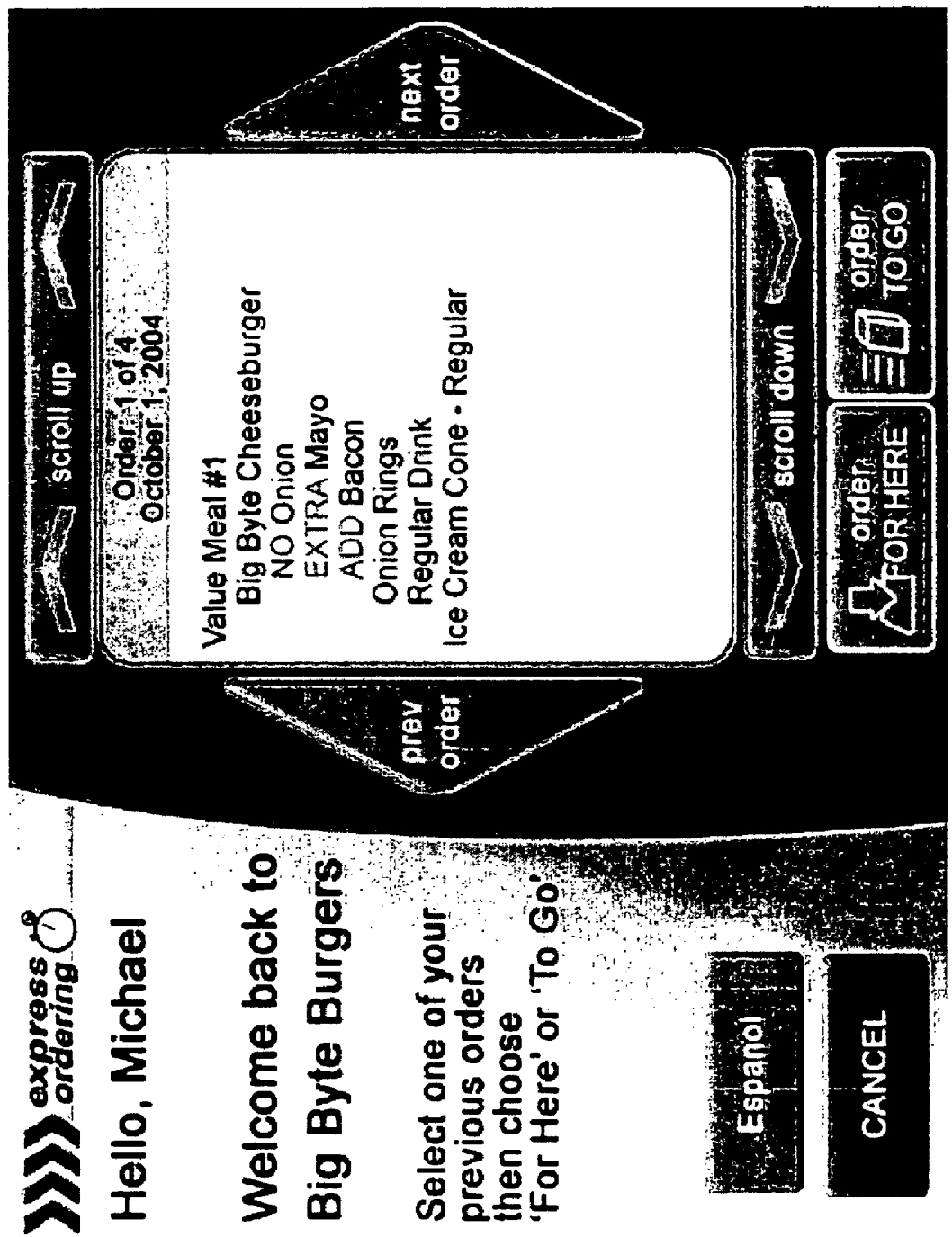
FIG. 13 is an exemplary display for the ICD in Express Order State.

An Express Order State, an example of which is shown in FIG. 13, is provided which is executed when an Express Order customer initiates a transaction and is identified, such as by swiping a debit or credit card, or by presenting a Radio Frequency Identification Tag (RFID) tag. The Express Order Module displays information which may take up the full screen, and presents a series of screens targeted to the specific customer. The Express Order Module may override other states, such as the Attract State.

Figure 1:
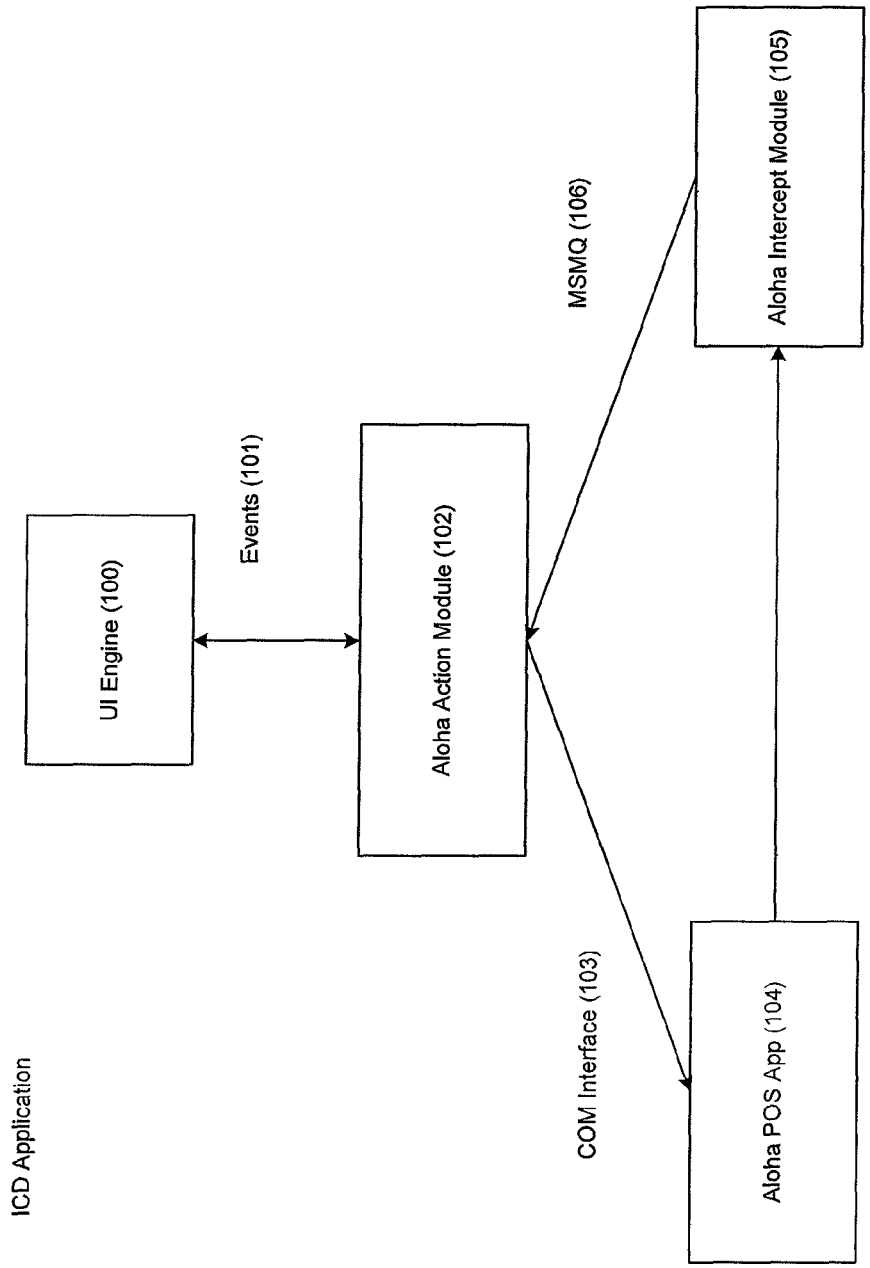
FIG. 1 is a simplified flowchart demonstrating the interaction between the User Interface Module, Event Handling Engine, and other modules in an exemplary embodiment.

As shown in FIG. 1, the ICD system can run on a point of sale (POS) terminal independently from the particular POS terminal software. In one embodiment, the ICD will interface with the Aloha Quick Service Restaurant (QSR) application, which is accomplished by the Aloha Intercept Module 105 and the Aloha Action Module 102. The Aloha QSR application is a commercially available POS system available from Radiant Systems, Inc., which is located in Alpharetta, Ga. Accordingly, other POS terminal software may operate with the ICD in the various embodiments.

The Aloha Intercept Module 105 in one embodiment is a Microsoft .NET assembly that implements the Aloha Intercept Activity Interface, which means that the Aloha QSR application calls it back after completing its own processing for sign-ins, sign-outs, selling items, deleting items, tendering, signing-out and most other significant retail functions.

In the embodiment of FIG. 1, The Aloha Action Module 102 is a Microsoft .NET assembly that implements the Aloha Component Object Module (COM) Interface 103, which means that it uses Aloha COM interfaces to read the receipt contents, sign-in, clock-in, read receipt items, get the transaction totals and add items, among other things. It responds to certain events published by the ICD application in order to insert upsell items into the Aloha transaction.

A User Interface (UI) Engine 100 is provided which is a stand-alone presentation layer capable of displaying a pre-configured touch-screen UI to a user with no dependencies on retail business logic. The UI Engine is modular and integrates into any number of back end systems, enabling separation of the retail business logic from the interface itself.

As shown in FIG. 1, the UI Engine 100 sends and receives Events 101 to and from the Aloha Action module 102. The Aloha Action Module 102 then sends transaction data to the Aloha POS application 104 using a COM interface 103. The Aloha POS application 104 then sends data to the Aloha Intercept Module 105 which then communicates data back to the Aloha Action Module 102 using Microsoft Message Queue (MSQ) 106 technology.

Because of its modular design, the UI Engine 100 has enough logic to display and navigate through a series of screens without the need for a POS back-end. In one embodiment, the UI Engine provides support for one or more of the following features:

Frames: Frames consist of a defined area and position, as well as a background color and optional background image.

Buttons: Any number of buttons can exist on a frame. Buttons consist of a size, position, background color, optional background image, and optional text. A button press can initiate any series of actions to be performed.

Text areas: Any number of text areas can exist on a frame. Text areas are identical to buttons except they do not respond to touch.

Animation areas: Any number of animation areas can exist on a frame. They consist of a size and position and are a container to play flash animation files.

Receipts: The UI Engine does not provide the concept of a receipt frame as retail point of sale (RPOS) does. Instead, it provides objects such as receipt list windows, total, and change windows that hold their respective data. These objects can exist on any frame, not just a 'receipt' frame. The UI Engine will expose an interface that allows external components to update these components in real-time.

The UI Engine provides full support for on-the-fly language selection in one embodiment. This allows a user such as a consumer to select one of any number of supported languages and see all content (images, text, and animation) from that point on in the selected language. In another embodiment, configuration of the UI may be provided in the form of an Extensible Markup Language (XML) configuration file, with supported languages determined by the configuration file. The UI Engine supports the concept of both a default language and a current language, with the current language set to the default language until a user initiates a change in the current language. Whenever localized content is available in the current language it can be used, but if no localized content is available the default language content will be used.

The Event Handling Engine is designed to work in conjunction with the User Interface Engine. In one embodiment it provides the ability to perform any number of actions when a button on the interface is pressed. The Event Handling Engine receives button press events from the UI Engine, looks up the actions that are authored on the button, and publishes those events to any components that are registered. Those components may then perform the desired business logic in response to the action. Some actions related to core UI functions, such as navigation and state management, will be handled internally by the Event Handling Engine. Most other events may be handled by external event handlers.

In another embodiment, the User Interface (UI) Configuration tool is a separate application which allows easy configuration of the user interface of the ICD. In order to provide quick, easy, and reliable configuration, this tool provides the configuration options necessary to custom-brand an ICD and deploy it quickly. Output from the tool in may be an XML file that conforms to the ICD schema and can be read in by the User Interface Engine. The UI Configuration Tool may provide templates and/or default values in the preferred embodiment to allow for rapid creation of the ICD UI.

A Logging Module is provided in another embodiment, and provides a simple interface that the ICD can call to log a message to a text file for diagnostic purposes. The Logging Module may also record screen touches. In other embodiments, the log file may be used to drive an ICD playback utility.

Express Order Module

Figure 2:
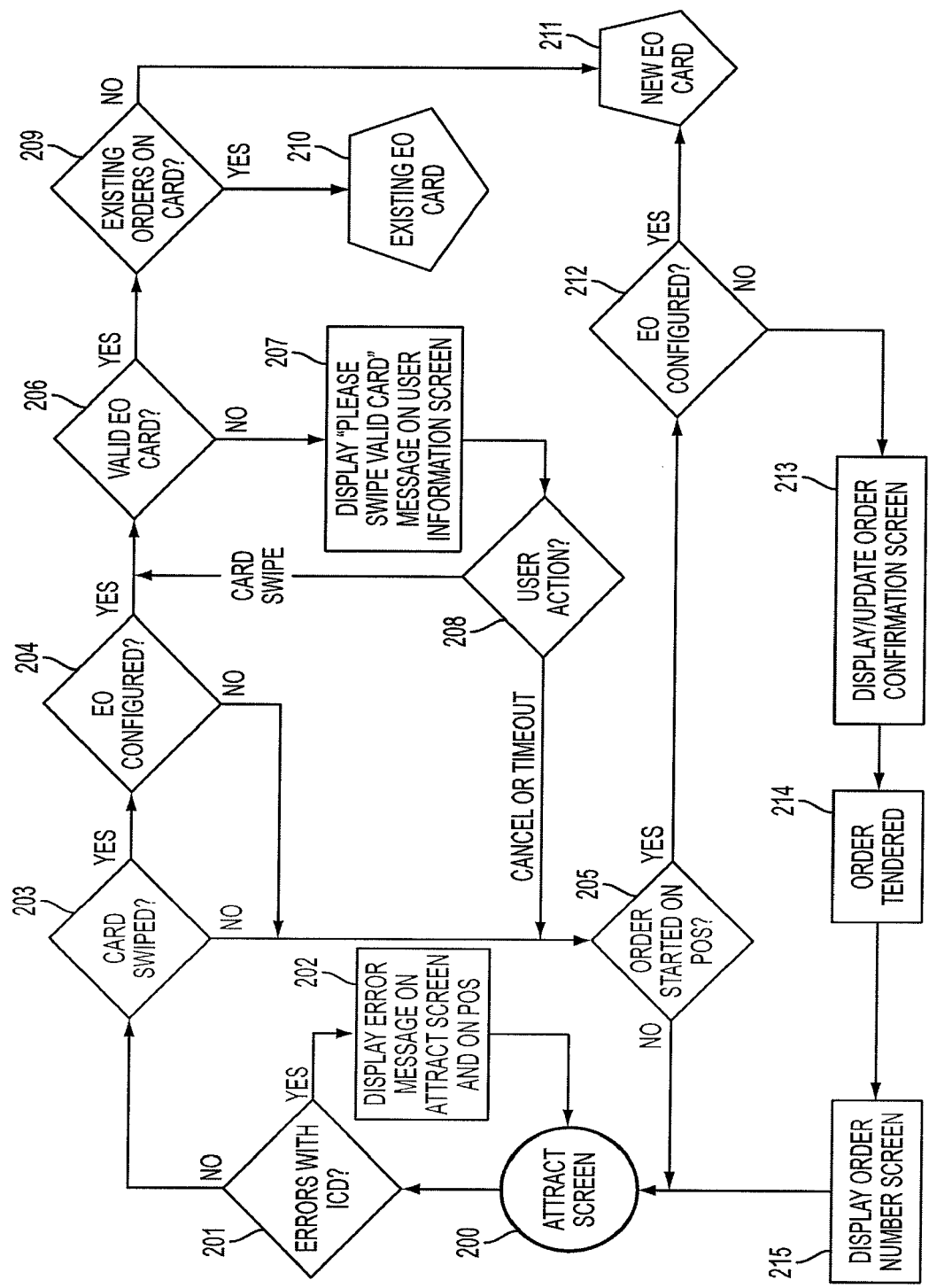
FIG. 2 is a flowchart for the initial states of the Express Order Module.

FIG. 2 illustrates one embodiment of the Express Order Module operating on the ICD system as described above. One of skill in the art will recognize that the Express Order Module can operate on any digital device, including the device of FIG. 14.

First, in the embodiment of FIG. 2, the ICD displays an Attract Screen 200, as described above. At 201, the method determines if there are any errors with the ICD 201, and if so, displays an error message on the Attract Screen and on the POS 202. If not, the method proceeds to determine if a card is swiped 203. In addition to using a credit or debit card 203 to identify the consumer, other means of identifying the consumer may be used as well, including by a loyalty card, gift card, login and password, biometric input device, wireless access device, radio frequency identification device, or bar-coded instrument. If the consumer was identified by a swiped card 203, then the method proceeds to determine if an Express Order was configured 204, and if so, to determine if the card is a valid Express Order card 206.

If, in the embodiment of FIG. 2, a card is not swiped 203, or if Express Order is not configured 204, then the method proceeds to 205, where it is determined if an order has been started on a point of sale terminal (POS). As used in the various embodiments of the present invention, a POS is interchangeable with any digital device in the various embodiments.

If it was determined at 206 that the card was not a valid Express Order card, then a "please swipe valid card" message is displayed on user Information Screen 207. It is then determined whether there has been a user action 208. If it is determined that the user swiped his or her card, then the method returns to check if it was a valid Express Order card 206. If, on the other hand, it is determined that the user action was a cancel or timeout, then the method proceeds to determine if an order has been started on the POS 205. If it was determined at 206 that the card is a valid Express Order card, then the method proceeds to determine if orders are associated with the card 209, and if so, the embodiment of FIG. 2 ends at step 210 and proceeds to the embodiment of FIG. 4 at step 400. If orders are not associated with an Express Order card, the method proceeds to step 211 and then proceeds to the embodiment of FIG. 3 at step 300.

Returning to step 205, the method determines if an order was started on the POS. If an order was not started, then the method of FIG. 2 returns to displaying the Attract Screen 200. If an order was started 205, and Express Order has been configured, as determined at 212, then the method proceeds to create a new Express Order card at step 211. If Express Order, however, was not configured, as determined at 212, then an order confirmation screen is displayed 213, the order tendered 214, and the consumer's order number is displayed 215. Finally, the method resumes displaying the Attract Screen 200.

Figure 3:
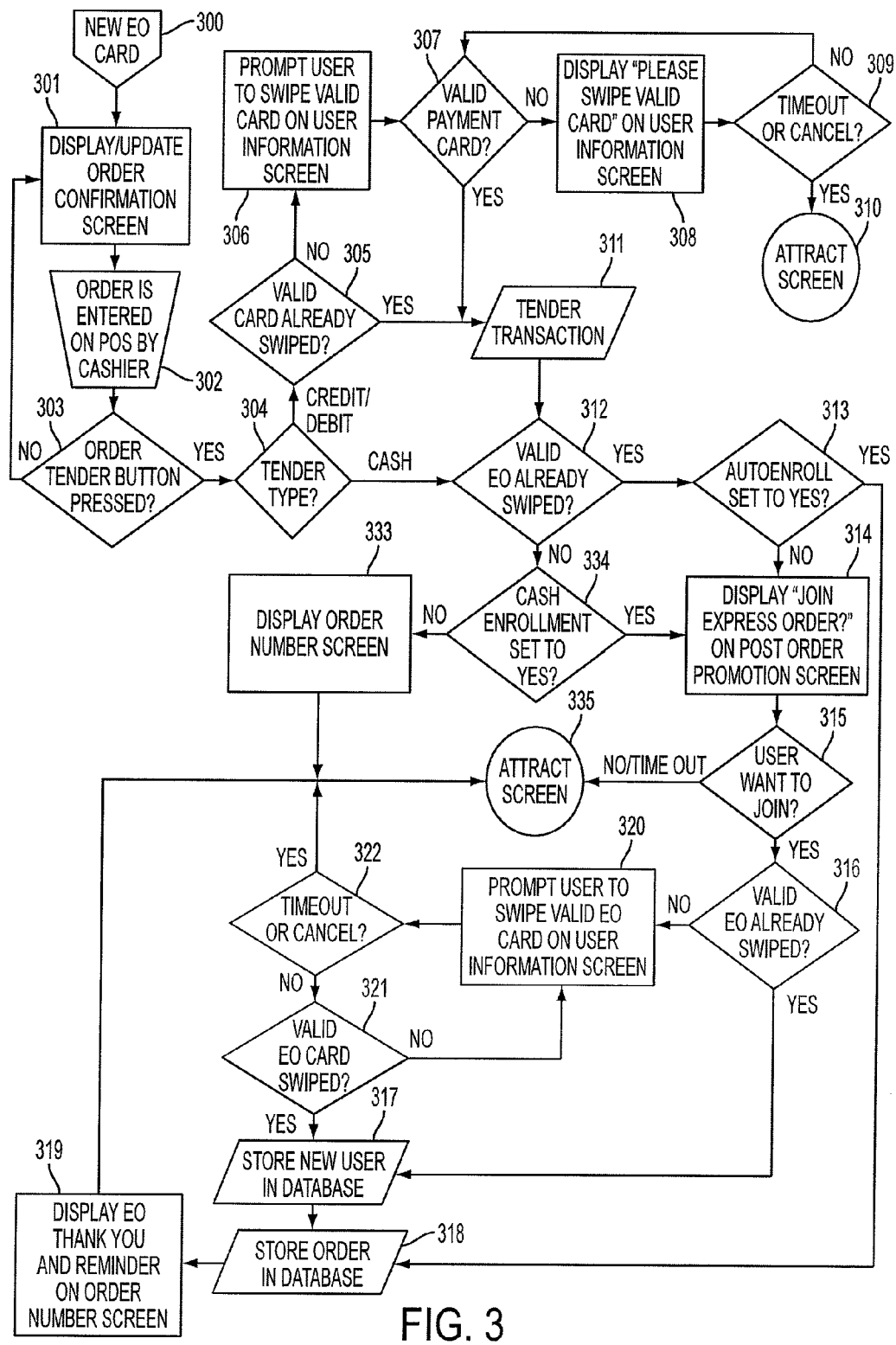
FIG. 3 is a flowchart representing the Express Order Module when a customer creates a new Express Order card.

FIG. 3 represents the logical steps taken in one embodiment of the present invention when a consumer creates a new Express Order card 300 for use with the Express Order Module. First, at step 301, the embodiment of FIG. 3 displays an order confirmation screen 301, and the order is entered on the POS by a cashier 302. It is then determined whether the order tender button was pressed 303. If not, the process returns to display the order confirmation screen 301. If the order is tendered 303, then the tender type is determined to be either credit/debit or cash, leading to steps 305 or 312, respectively.

If the determined tender type is credit/debit, then the embodiment of FIG. 3 proceeds to determine whether a valid card was already swiped 305. If not, the user is prompted to swipe a valid card on the User Information Screen 306, and it is determined whether a valid payment card is used 307. If it is determined at 307 that a valid card was not used, "Please swipe valid card" is displayed in User Information Screen 308, and it is determined whether there is a timeout or cancel 309. If there has been a timeout or cancel, the embodiment of FIG. 3 returns to the Attract Screen 310. If not, it is again determined whether a valid payment card was used 307. If it was determined, at 305, that a valid payment card was already swiped, or that one was used at 307, the embodiment of FIG. 3 proceed to tender the transaction 311. Once the transaction is tendered, or if the tender type is cash, then the embodiment of FIG. 3 proceeds to determine 312 if a valid Express Order card was already swiped. If not, it is determined, at 334, whether cash enrollment is set to YES. If not, a display order number screen is displayed 333, and the process ends at the Attract Screen 335. If it is determined, at 312, that a valid EO was already swiped, the process determines if the AutoEnroll feature is enabled 313. If the AutoEnroll feature is set to YES 313, then the method proceeds to store the consumer's order in a database 318. Alternatively, if either (1) it is determined at 313 that the AutoEnroll is not set to YES or (2) a valid Express Order card was not swiped 312 and the cash enrollment option is set to YES, then the method of FIG. 3 displays "Join Express Order" to the consumer 314. It is then determined, at 315, whether the user wants to join. If not, or there is a timeout, the embodiment of FIG. 3 ends at the Attract Screen 335. If the user wants to join 315, it is determined, at 316, whether a valid EO was already swiped. If not, the user is prompted to swipe a valid EO card on User Information Screen 320, and it is determined whether there has been a timeout or cancel 322. If so, the embodiment of FIG. 3 ends with the Attract Screen 335. If not, it is determined, at 321, whether a valid EO card is swiped and, if not, the user is again prompted 320. If it is determined at 316 or 321 that a valid Express Order card was swiped, then the new consumer 317 and their order 318 are stored in the database. Subsequently, a thank you screen is displayed 319, and the embodiment of FIG. 3 ends at the Attract Screen 335.

Figure 4:
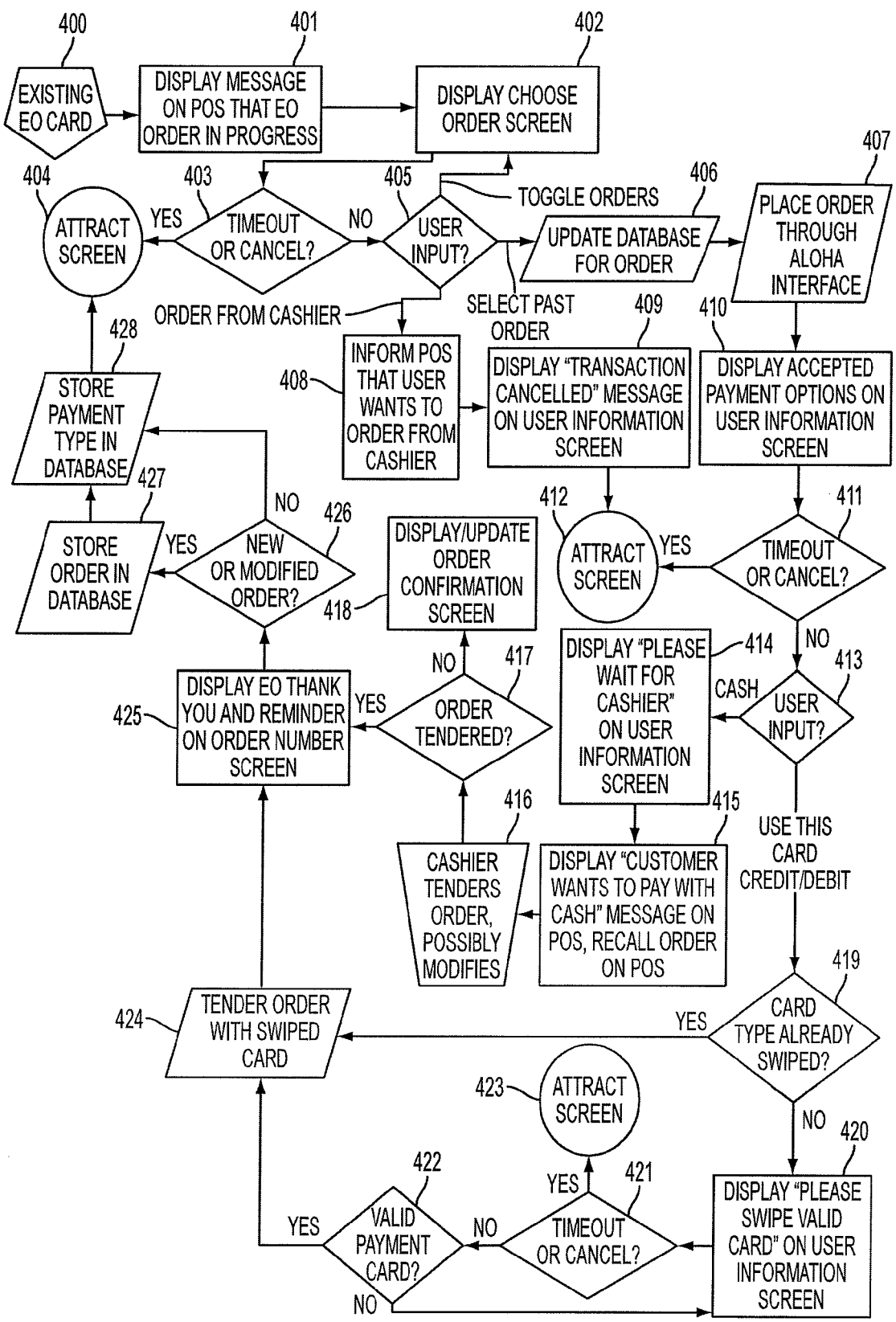
FIG. 4 is a flowchart representing the Express Order Module when a customer has an existing Express Order card.

If the method of FIG. 2 determined that the consumer was using an existing Express Order card at step 210, step 400 is invoked in the embodiment of FIG. 4. First, in FIG. 4, the method displays a message on the POS that an Express Order is in process 401, displays the Choose Order Screen 402, and then determines, at 403, if a timeout or cancel has been detected by the method of FIG. 4. If, for example, the user fails to take an action within a predetermined amount of time, then the method ends at the Attract State 404. If, however, the consumer supplied input to the method 405, the consumer may toggle orders, order from the cashier, or select a past order. If it is determined at 405 that the user toggled orders, the method returns to 402 where the choose order screen is displayed. If, on the other hand, it is determined, at 405, that the user ordered from a cashier, the POS is informed that the user wants to order from the cashier 408, a "transaction canceled" message is displayed on the User Information Screen 409, and the method ends at the Attract Screen 412. Finally, if it is determined, at 405, that the user selected a past order, the method updates the database with that order 406, places the order through the Aloha Interface 407, and displays accepted payment options on the User Information Screen 410. Next, the method determines if a timeout or cancel has been detected 411. If so, the method ends at the Attract Screen 412. If not, the method determines if the consumer used cash or the credit or debit card swiped to enroll in an Express Order account 413. If credit/debit card was used, it is determined whether the card type was already swiped 419. If not, "Please swipe valid card" is displayed on the User Interface Screen 420, and it is determined whether a timeout or cancel is detected 421. If so, the method ends at the Attract Screen 423. If not, it is determined, at 422, whether a valid payment card was used. If not, the method returns to 420. If, on the other hand, it is determined at either 419 or 422 that a valid card was used, then the order is tendered with the swiped card 424.

Next in the embodiment of FIG. 4, the ICD displays a thank you message, the consumer's order number 425, and then determines if the order is new or modified 426. If the consumer's order is a new order, then the order is stored in a database 427 and associated with the customer via the swiped Express Order card. If not, or after a new order is stored 427, the consumer's payment type is stored in the database 428, and the method ends at the Attract Screen 404. If it was determined, at 413, that cash was used, then the method displays "Please wait for cashier" on the "User Information Screen" 414 and "Customer wants to pay with cash" message on the POS, and recalls the order on the POS 415. The cashier then tenders the order 416. The method then determines if the order was tendered 417. If not, the order confirmation screen is displayed 418. Otherwise, the method proceeds to 425, as described above.

Figure 15:
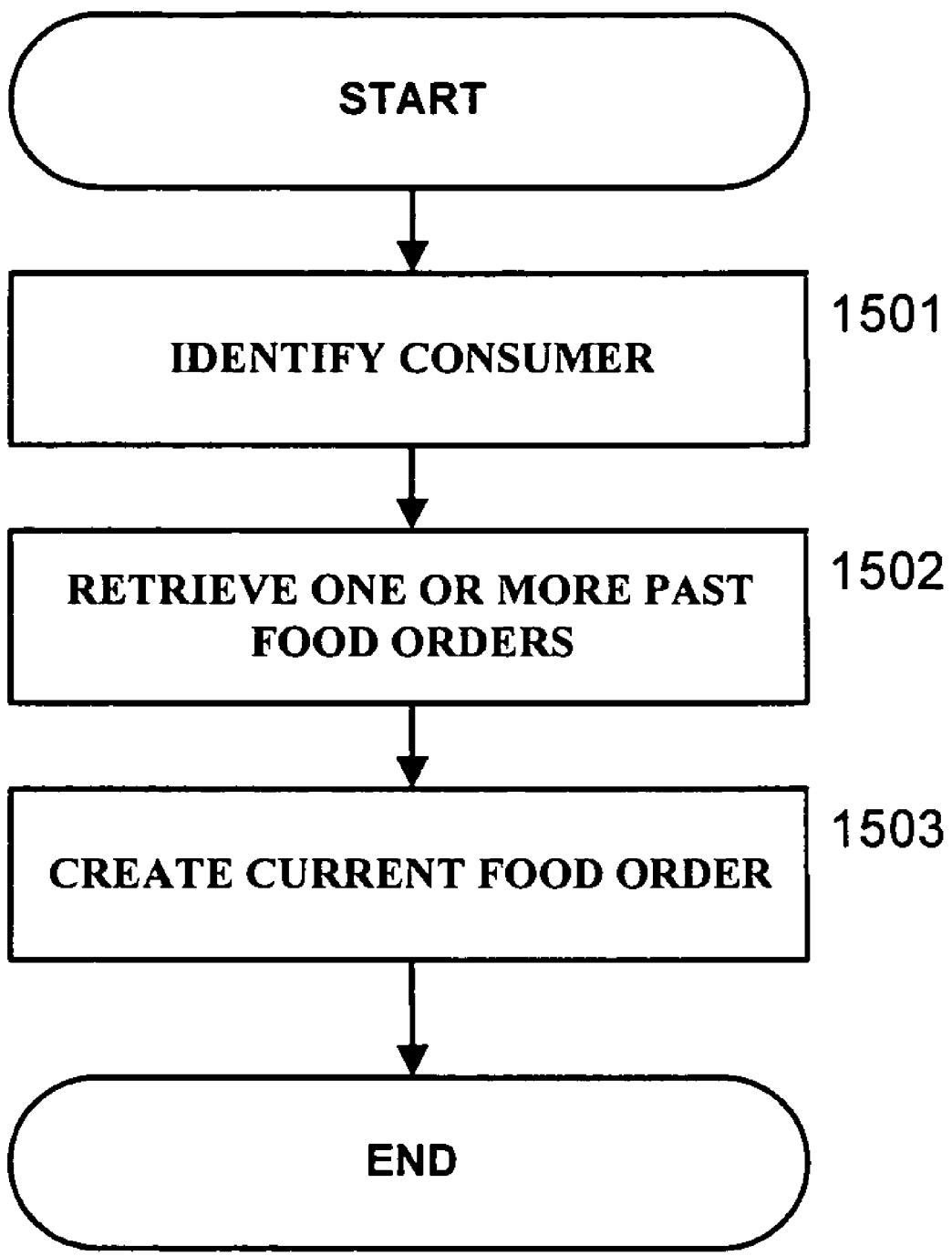
FIG. 15 illustrates a logical overview of an Express Order in one embodiment.

An Express Order is illustrated in another embodiment as shown in FIG. 15, which is drawn to a consumer ordering food orders, but one of skill in the art will appreciate that the method is equally applicable to orders for any type of good, product, or service. First, in the embodiment of FIG. 15, the consumer is identified 1501, the consumer being associated with one or more past food orders. Food orders in the current embodiment comprise one or more food items. For example, a food order at a restaurant may consist of three items, such as hamburger, fries, and a COKE. Second, one or more past food orders associated with the consumer are retrieved 1502. For example, the method may retrieve one order consisting of a cheese burger, COKE, and fries, and another order consisting of a cheese burger, DIET COKE, and fries.

Figure 8:
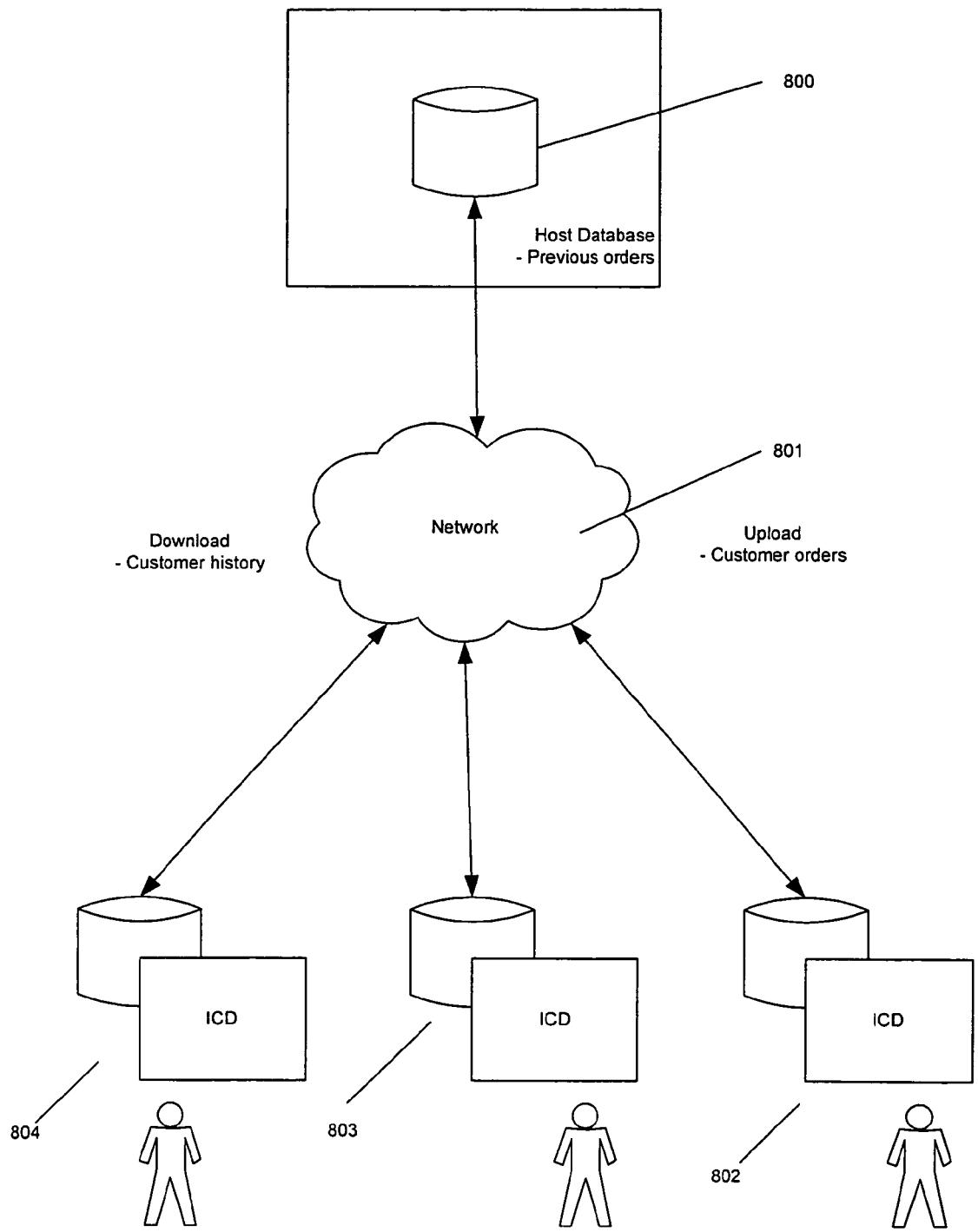
FIG. 8 is a diagram for Express Orders available across multiple stores.

Past orders may be retrieved from various sources. For example, orders may be retrieved from a computer system residing with the local vendor. In the embodiment of FIG. 8, past orders are stored at a host database 800 and made available to all sites 802, 803, 804 in communication with the host database 800 over a network 801 such as the Internet. Vendors may be connected either through a persistent connection over the network 801 to the host database 800, or stores may periodically connect to the host database 800 over the network 801 to retrieve the most recent order information.

In another embodiment, Express Orders allow customers to use a web-based application to manage their Express Order account. For example, the customer may use a web application to manage their personal information, create orders, and specify the payment method to be used for Express Orders. Additionally, customers may name each order using their own personalized name that will be displayed at order time. Express Order accounts may be stored at a central host database 800 and made available to any Express Ordering site.

Finally, in the embodiment of FIG. 15, a current food order is created for the consumer based on the one or more retrieved past food orders 1503. For example, a current food order comprising a cheese burger, COKE, and fries may be created for the consumer.

In one embodiment extending the embodiment of FIG. 15, the current food order may be created by the consumer. For example, the user may decide that she wants a food order which is identical to the retrieved food order. In another embodiment extending the embodiment of FIG. 15, the consumer's current food order is based on the one or more retrieved food orders, and is created on behalf of the consumer. For example, the current food order could be automatically created for the user by applying rules to the retrieved food orders, such as by choosing one or more food items which are identical or similar to previously ordered items. In the various embodiments, rules include logical rules, Boolean logic rules, matching rules, weighted parameters, statistical methods, and intelligent methods. In further embodiments, the current food order may be created to contain at least one item which is not part of the retrieved food orders.

Figure 20:
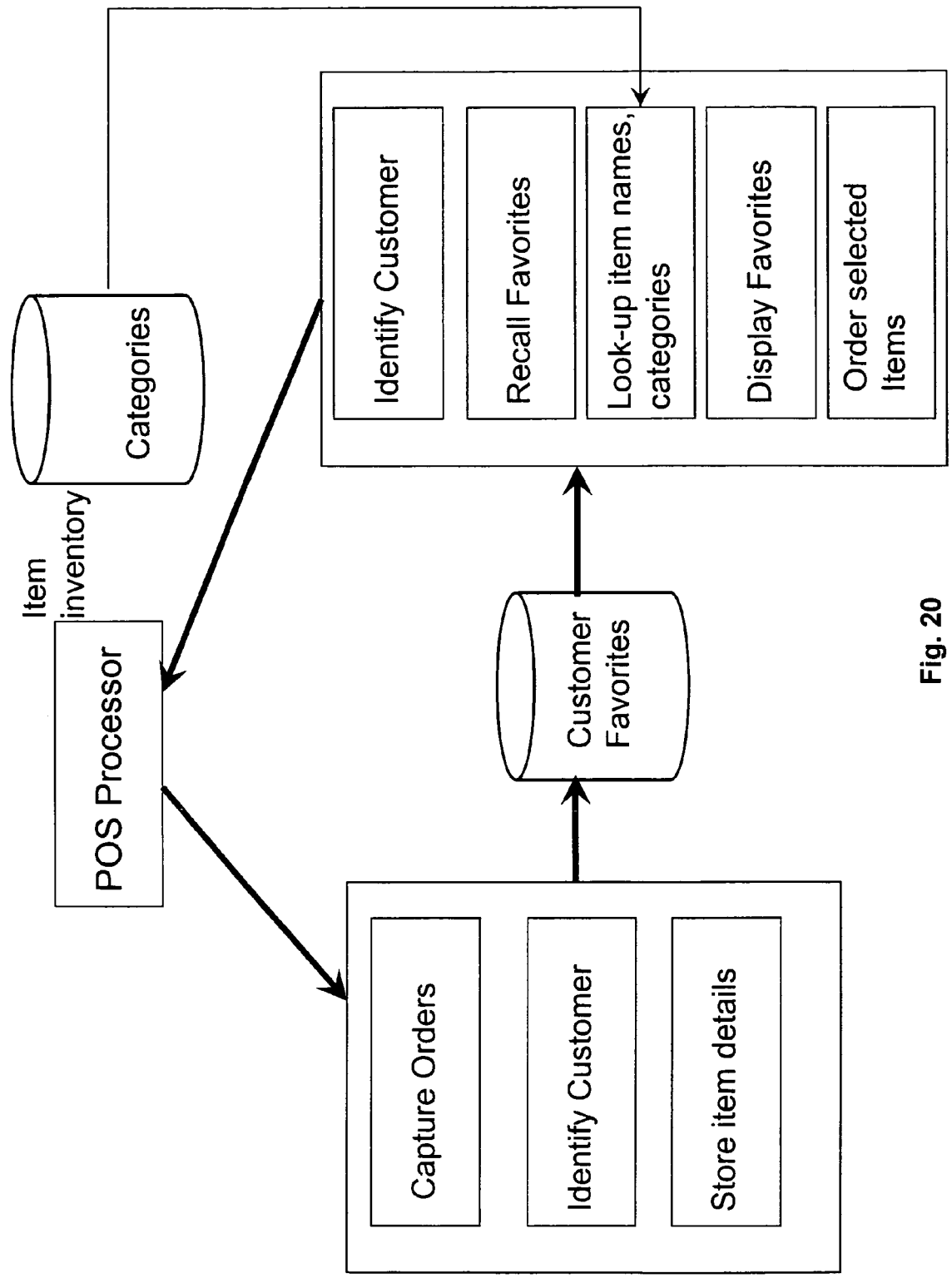
FIG. 20 provides a logical overview of one embodiment of an Express Order.

FIG. 15 may be extended to additional embodiments which suggest items to be included in the consumer's food order. For example, an item may be suggested to the consumer based on the one or more retrieved food orders, such as where the suggested item is not part of a retrieved food order, or is the same or similar to an item in the retrieved food orders. Another embodiment may also generate an order menu for the consumer based on the current food order, and the menu may be communicated to the consumer using a digital device such as a self service station, kiosk, point of sale terminal, interactive customer display, personal computer, set top box, personal digital assistant, cell phone, or the digital device of FIG. 14. The logical relationship between components of an Express Order is provided in one embodiment as shown in FIG. 20.

In an embodiment based on the embodiment of FIG. 15, food items are provided by a restaurant such as a fast food restaurant, including MACDONALD'S, WENDY'S, BURGER KING, CHICK-FIL-A, KENTUCY FRIED CHICKEN, SUBWAY, HARDEE'S, ARBY'S, and POPEYES.

The food items of one Express Order embodiment may be further defined or described using one or more modifiers. Modifiers can describe the amount or type of condiments for the associated food item, such as 'NO', 'ONLY', 'LIGHT', 'HEAVY', and 'ADD', the preparation of the associated food item such as 'RARE', 'MEDIUM', and 'WELL DONE', as well as describe the size of the associated food item, such as 'SMALL', 'MEDIUM', and 'LARGE.'

In view of the above, an Express Order provides a service that employees cannot. Every time a repeat customer returns to the store, Express Order will remember who they are and present a customer with a list of their favorite items, the way they like them. The customer no longer needs to weed through the entire menu to find their favorite items. Nor does the customer need to remember to say 'No onions.' A customer can now select an item and have it rung up with the desired modifications. For example, customer A either orders the Chicken sandwich with extra mayo and no pickles or the Cajun Chicken Salad with no onions and extra ranch dressing every time he visits the store. Now instead of repeating this entire order to a cashier, the customer can simply identify himself, such as by swiping a credit or debit card, view these two favorite items with the modifiers already applied on screen, and order the desired item the desired way.

Express Orders enable a vendor to serve consumers faster, enabling more consumers to be served in a given amount of time. Customers' orders are more accurate, since the order is rung up correctly and there is a reduced chance of miscommunication between employees. Customers are more satisfied because they get what they want—they will no longer forget to say "No Onions" and end up with onions on their sandwich.

Promotions Module

Figure 5:
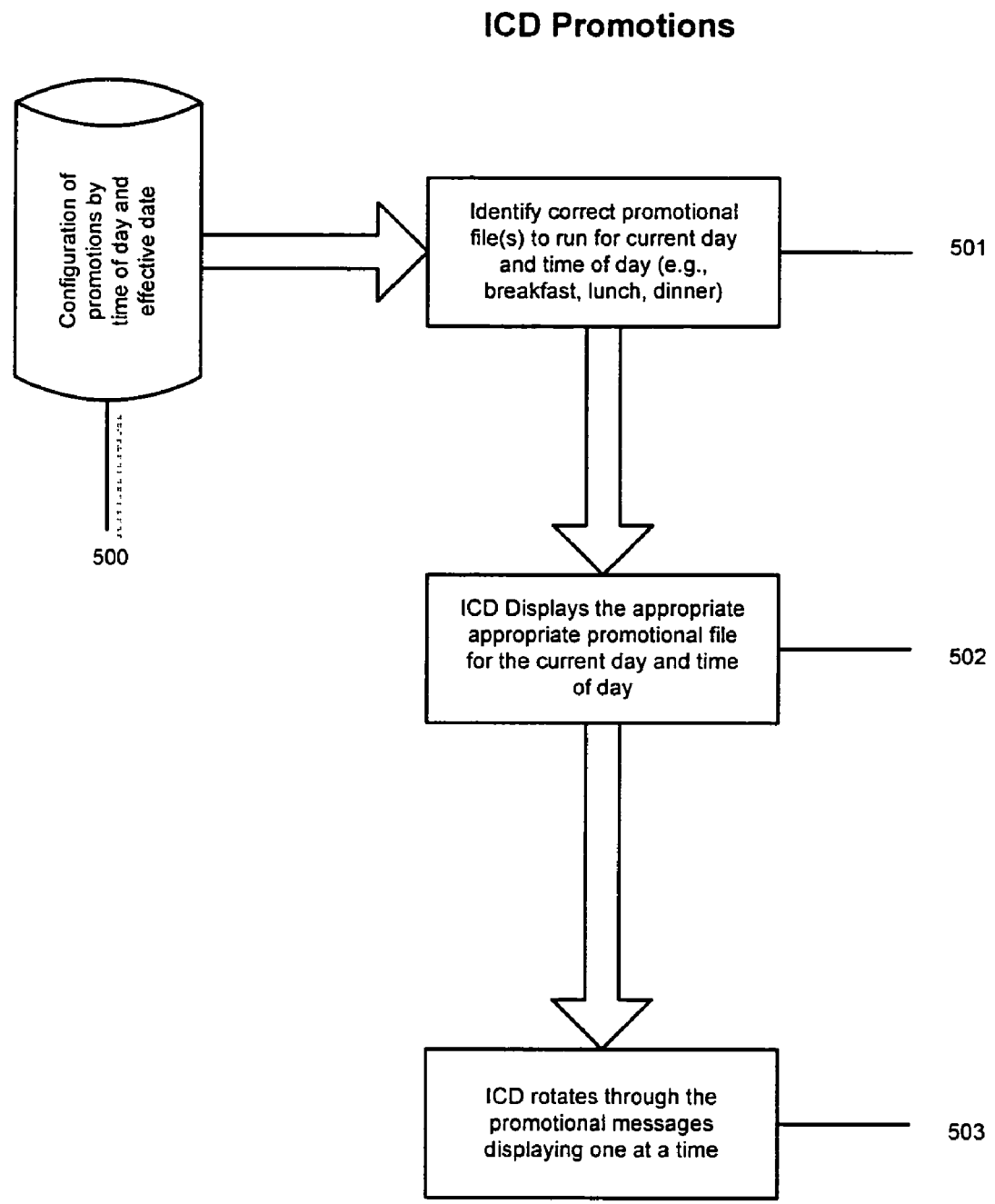
FIG. 5 is a simplified flowchart representing the Promotions Module.

The Promotional Module is responsible for driving the display of advertising in the ICD. As shown in FIG. 5, the Promotional Module displays 502 start and stop promotion events at certain times based on the promotion schedule 501 detailed in the configuration XML. The User Interface frame containing the promotion will respond to the promotion event by starting or stopping a play list 503, which is a sequence of graphics or flash animations.

Figure 10:
FIG. 10 is an exemplary display for the ICD in Attract State.

In one embodiment, there are three POS states in which promotions can run. A different set of promotions can be configured to run in each of these states. In Attract State, as exemplified in FIG. 10, there is no active order running on the ICD and the promotion may be displayed on the entire screen.

Figure 11:
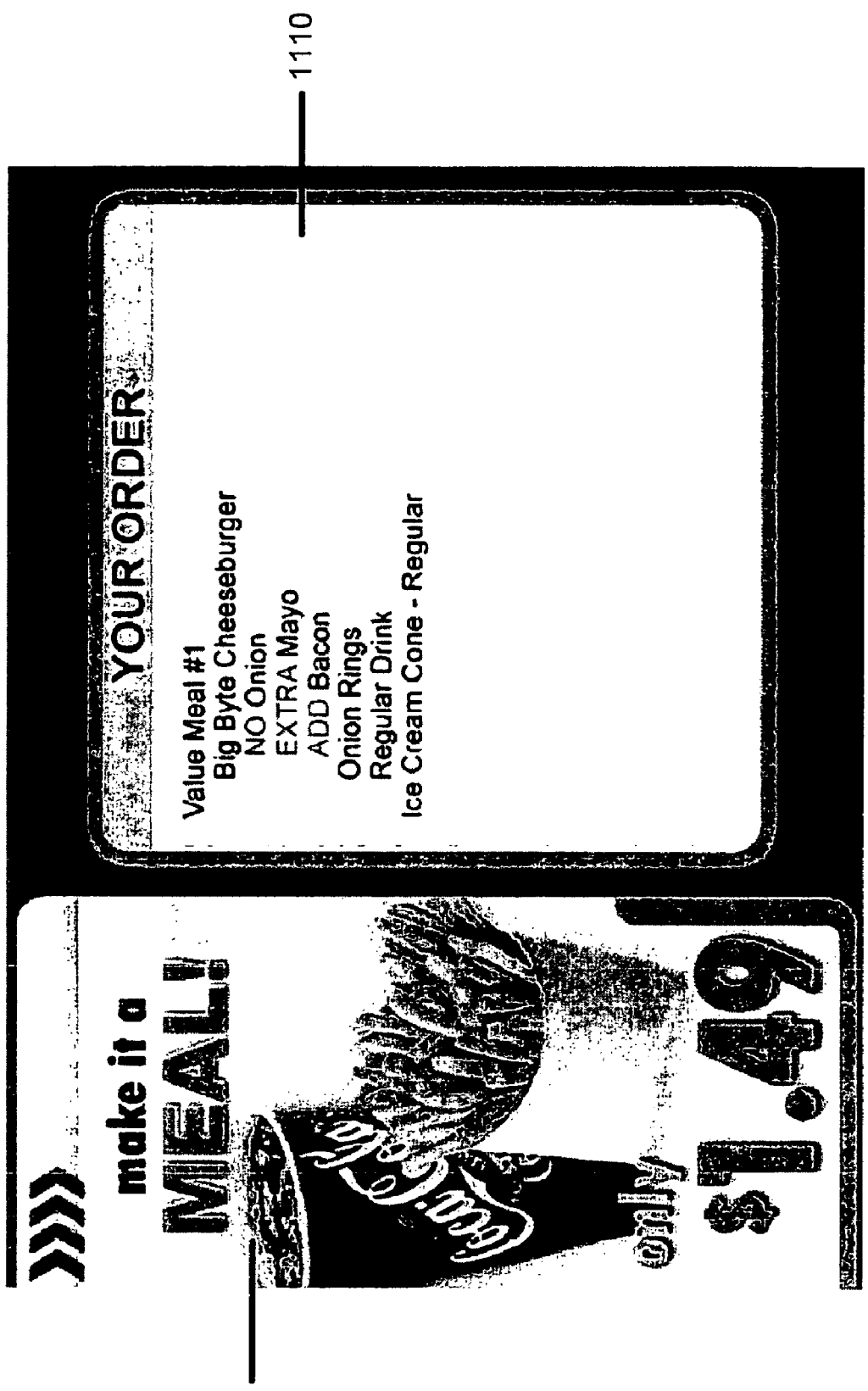
FIG. 11 is an exemplary display for the ICD in Order Confirmation State.

As shown in the embodiment of FIG. 11, in Order Confirmation State there is an active order on the ICD and order confirmation display is turned on, displaying the order confirmation and the scheduled promotion. In FIG. 11, the order confirmation displays on the right ⅔ of the screen 1110, and the left ⅓ of the screen will display scheduled promotions 1111. Lastly, Final Screen State displays upon an order being tendered and displays the change due to the customer and the scheduled promotional message. In one embodiment the top ⅔ of the screen will display the scheduled promotional message and the bottom ⅓ of the screen will display the change due to the customer.

To create promotions using the Promotion Scheduler Module in one embodiment, three steps are used. First, one or more content files are created using a third party content creation tool. A content file can consist of static bitmaps, animations, or full motion video promotions. A promotion in the preferred embodiment refers to a single message (e.g. animated message promoting new salad item or a static graphic indicating that the site now accepts credit). Each of these are considered individual promotions. The user can create one content file with the third party tool that consists of multiple promotions or they can create an individual file for each promotion.

In the second step of the current embodiment, an end user creates a playlist and adds content files into the playlist, which can consist of one or more content files. The user will specify the order in which the content files should be displayed, and the two options for display order are numbered order or random display. For static graphic content files, the user will need to specify a dwell time (time that the static graphic should display). Options for dwell time are number of seconds or continual. Continual will display the static graphic as long as the ICD is in that state.

In the third step of the current embodiment, an end user creates a configuration file and assigns playlists to the file. A configuration file contains all of the configuration data required to run the ICD for a particular ICD terminal. One playlist per daypart can be assigned to a configuration file. Each configuration file should have a start date and is in effect until the start date for another Configuration file begins. Only one configuration file can be in effect at any given point in time.

Upsell Module

Figure 6:
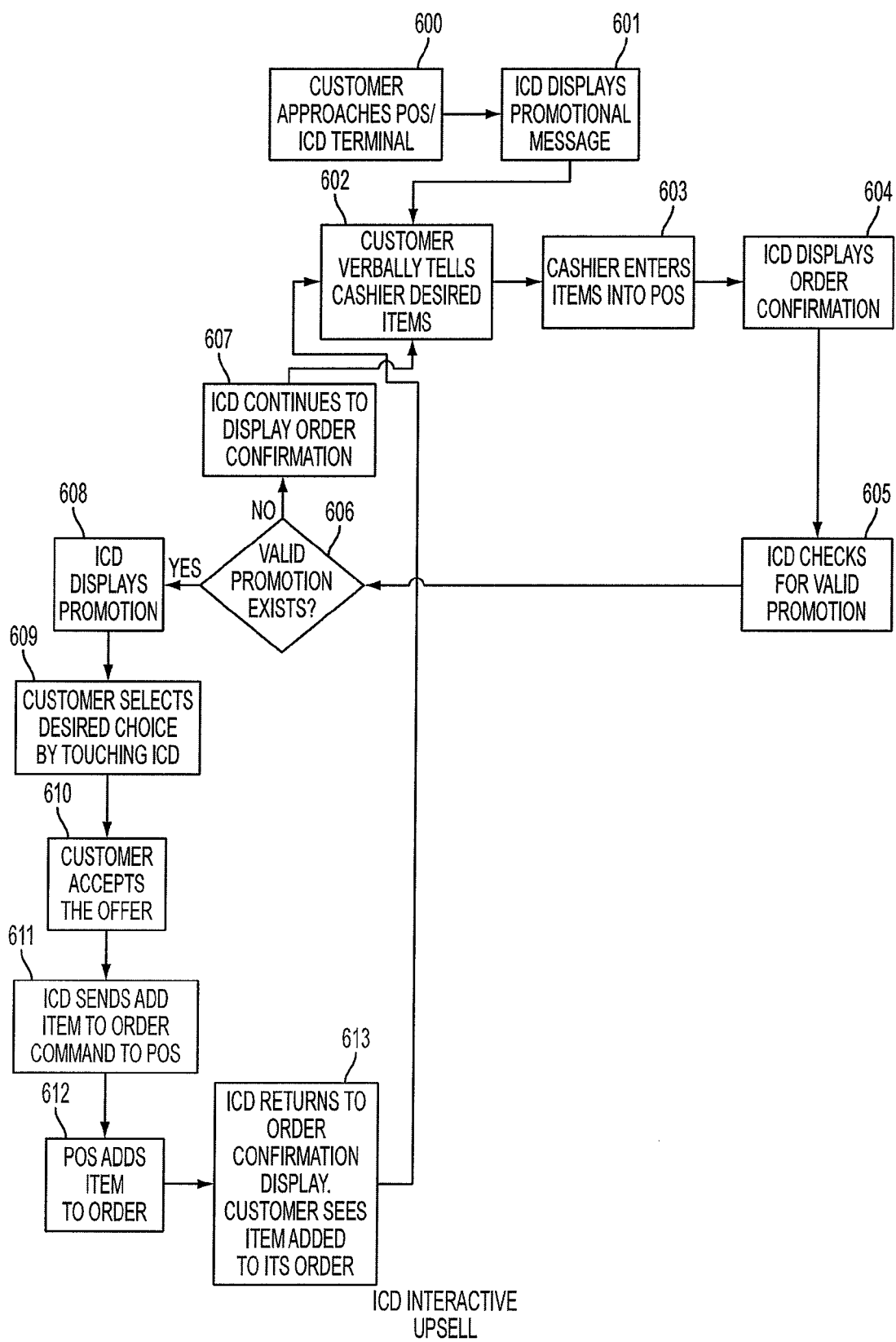
FIG. 6 is a simplified flowchart representing the Upsell Module.
Figure 12:
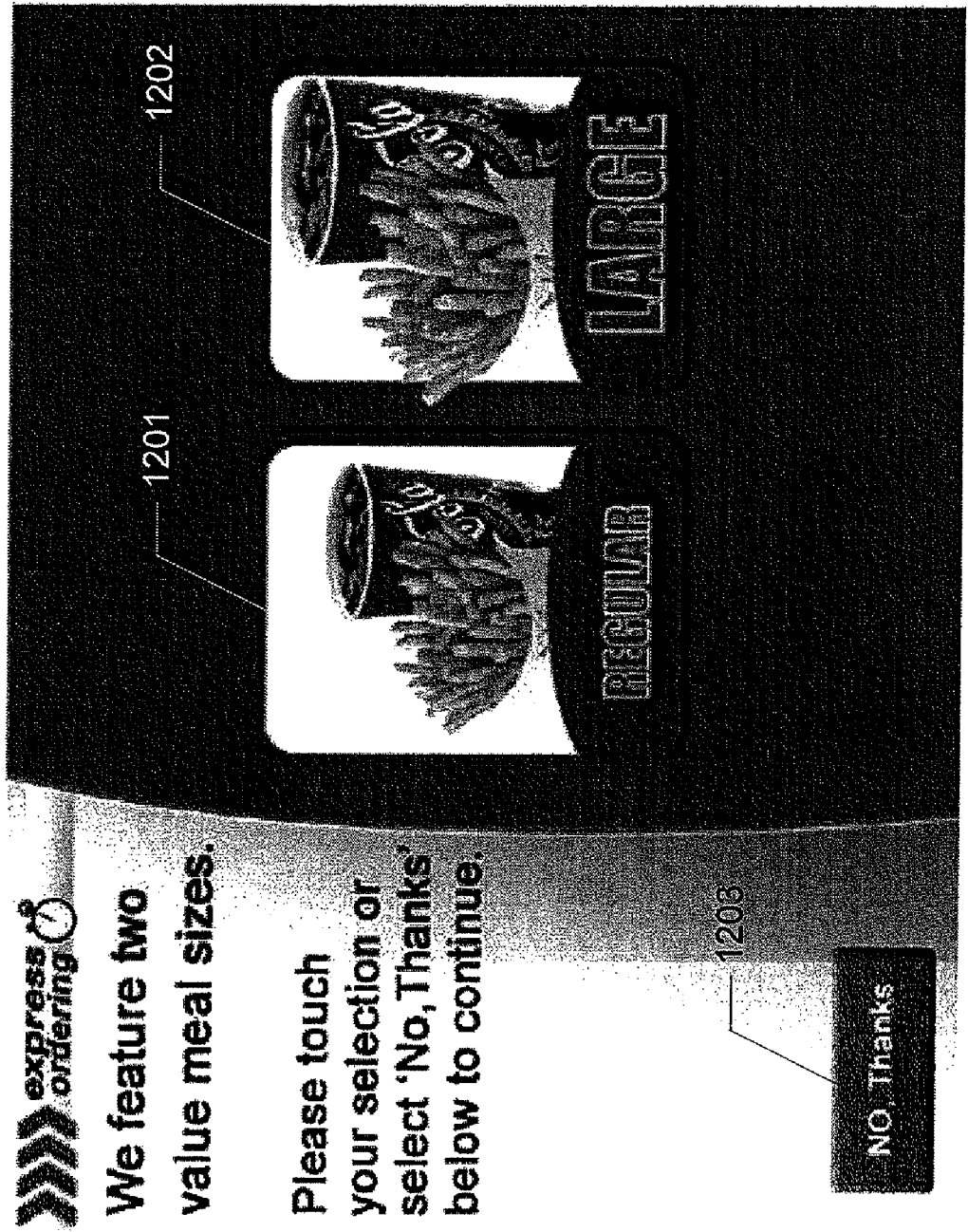
FIG. 12 is an exemplary display for the ICD in Upsell State.

The Upsell Module enables a client to configure an Upsell Screen and the rules that will trigger the upsell being displayed. In the embodiment depicted in FIG. 12, the Upsell Screen has touchable buttons 1201, 1202, and 1203 that a customer will touch to make their selection. In the embodiment shown in FIG. 6, the customer approaches the POS/ICD terminal 600. The ICD displays a promotional message 601, the customer verbally tells the cashier the desired items 602, the cashier enters the items into the POS 603, and the ICD displays the order confirmation 604 and checks for a valid promotion 605. It is then determined, at 606, whether a valid promotion exists. If not, the ICD continues to display the order confirmation 607, and the embodiment of FIG. 6 returns to 602 where the customer verbally tells the cashier the desired items. If it is determined that a valid promotion does exists (i.e., when an upsell rule is triggered) 606, the corresponding Upsell Screen for that rule is displayed 608. The Upsell Screen will display until the customer makes a selection on the screen 609 or one of the following conditions are met. The user will be able to configure which of the following alternate conditions should be used:

Cashier orders next item on the POS.
Specified time period lapses (number of seconds).
Neither—Display upsell until customer makes selection.

If the customer accepts the upsell offer 610, the ICD application sends the Price Look Up (PLU) being ordered to the Aloha POS 611 through the COM interface. The Aloha POS then updates the customer's transaction 612 with the upsell item. The order is updated on the POS and on the Order Confirmation Display 613. The process then returns to 602 where the customer verbally tells the cashier the desired items. The ICD then returns to the previous POS state. If the previous state was an Order Confirmation Display (OCD), then the visual receipt will display the upsell item.

Upsell Screens are defined and then assigned to an upsell rule in one embodiment. If the rule is met, then the corresponding Upsell Screen is displayed to the consumer. A plurality of rules are provided in the current embodiment, including:

POS Action: If a specific POS action is met, then display upsell screen x.
Initially two POS actions will be supported:
Transaction finalized (example: upsell dessert at end of order).
Transaction initiated (example: upsell new promotional item at beginning of order).
PLU Sold: If a specific PLU is sold, then display upsell screen x.
Multiple PLUs can be configured in the sold condition as either:
If PLU 1 and PLU 2 sold.
If PLU 1 or PLU 2 sold.
Category Sold: If a specific category is sold, then display upsell screen x. This condition would need to check each PLU sold at the POS and once a PLU in the specified category(ies) are sold, trigger the upsell screen.
PLU or Category Not Sold: Check if a specific PLU or PLU from a specific category has been sold. If not, then display the upsell screen. For example, the dessert upsell screen should only be displayed if no items from the dessert category have been sold.
Each of the "sold" conditions in the current embodiment can be used in conjunction with POS Action. For example, when a transaction is finalized, the ICD can check if a PLU/Category has or has not been sold. Upsell rules are assigned to a specific daypart within an ICD configuration file. One or more upsell rules can be assigned per daypart per configuration file in the current embodiment.

The Upsell Module also supports the following options in one embodiment for displaying a message to the cashier indicating what is being upsold to the customer:
Do not display a message.
Display a message to the cashier when an upsell is being presented to the customer.
The message displayed to the cashier tells the cashier that the customer is being upsold and dynamically displays the item text for the PLU's being presented to the customer so that the cashier knows what is being offered. The display to the cashier may be displayed in a pop-up window on the POS in one embodiment. When the cashier hits OK on the message box, the message will disappear and the cashier can continue ordering items.

In another embodiment, the Upsell Module may track the upsells being presented to the consumer and how many offers are accepted and declined, so vendors can determine the effectiveness of specific offers.

Loyalty Module

Figure 7:
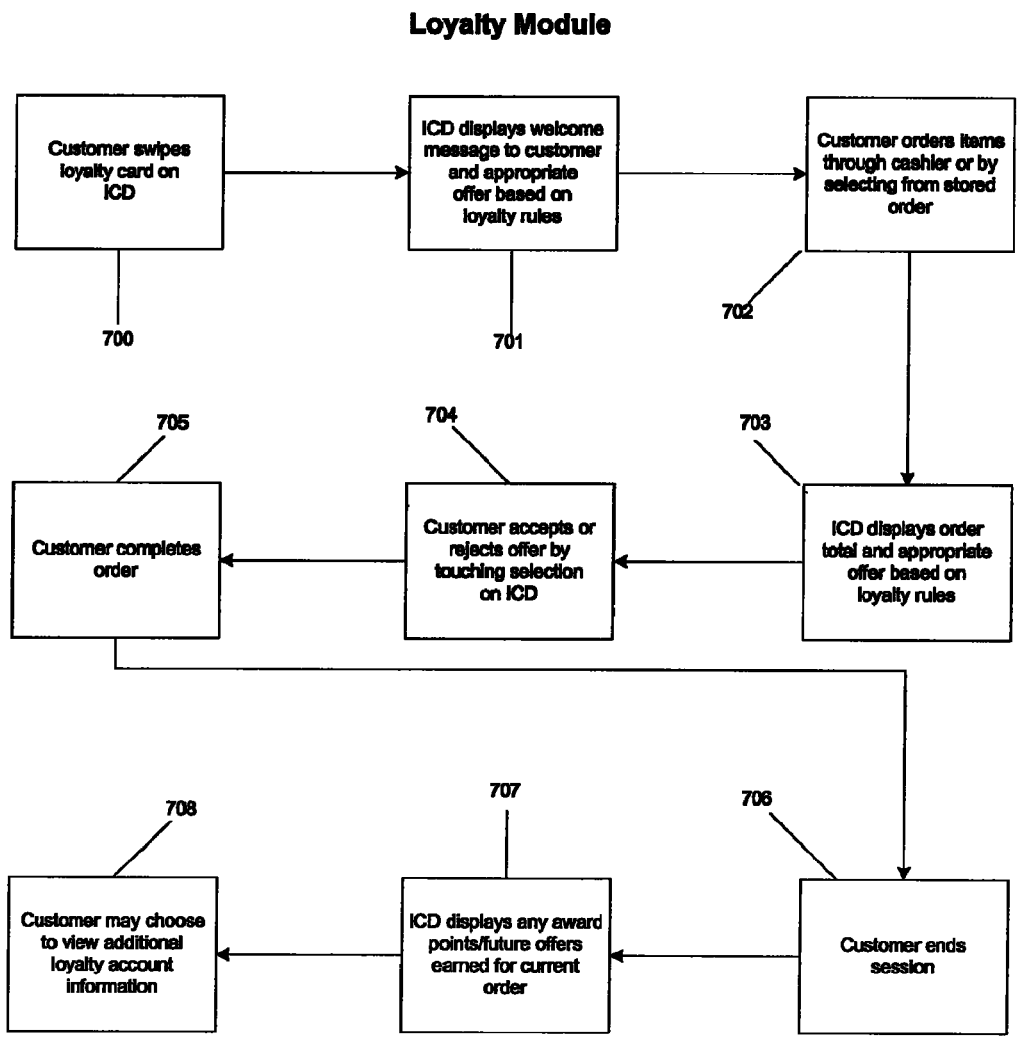
FIG. 7 is a simplified flowchart representing the Loyalty Module.

The Loyalty Module in the embodiment of FIG. 7 offers items or promotions on the ICD based on loyalty rules which consider the customer's last order or ordering preferences. The Loyalty Module activates when a customer is identified, such as by swiping a loyalty card on an ICD 700, causing the ICD to display a welcome message to the customer along with appropriate offers based on the loyalty rules 701. The customer can then order items through the cashier or by selecting an item from a stored order 702. In one embodiment, the ICD then displays the order total and appropriate offer based on the loyalty rules 703. The customer may then accept or reject the offer 704 and complete the order 705, ending the session 706. The Loyalty Module in another embodiment then causes the ICD to display any award points and future offers earned from the current order 707. Finally, the customer may choose to view additional loyalty account information 708.

Preferred Order Module

Figure 16:
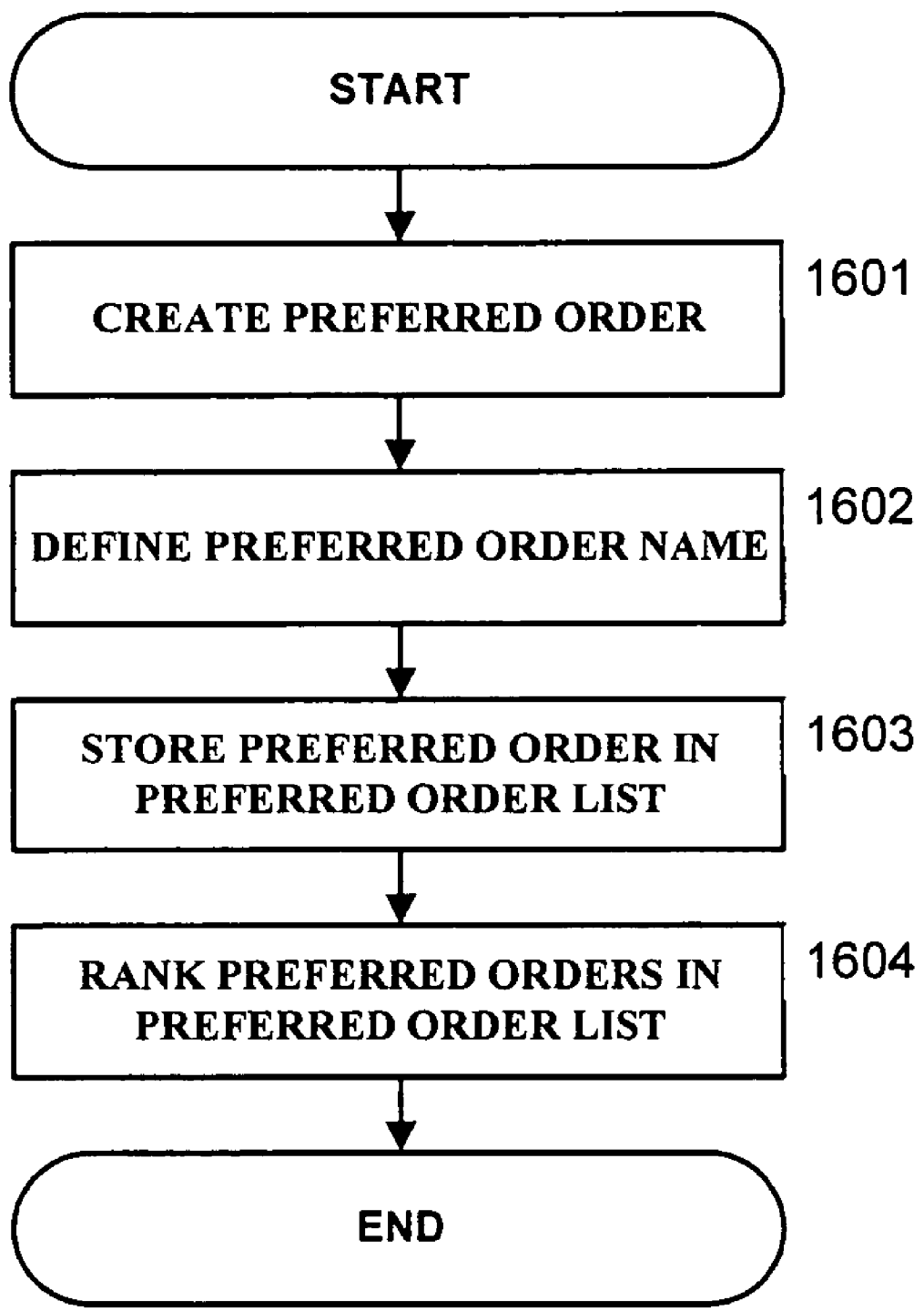
FIG. 16 illustrates a logical overview of a Preferred Order in one embodiment.

In one embodiment of the present invention, as shown in FIG. 16, consumer ordering is facilitated through the use of Preferred Orders. First, a Preferred Order is created and associated with a consumer 1601. In the current embodiment, an order comprises one or more items. Second, a name is defined for the preferred order 1602. For example, an order consisting of three burgers, three DIET COKES, and three fries could be defined by the consumer as the "Soccer Practice Lunch."

Third, the Preferred Order is stored in a list of Preferred Orders associated with the consumer 1603, much like a list of favorite orders. Fourth, the Preferred Orders are ranked in the list 1604, such that the raking determines the order that the consumer's preferred orders will be displayed when viewed by the consumer. Here, the consumer ranks the "Soccer Practice Lunch" order as the second Preferred Order in the list, and another order consisting of a cheeseburger, a coffee, and fries is named "Work Lunch", and is ranked first by the consumer according to the frequency with which the "Work Lunch" is ordered. Accordingly, when the consumer subsequently sees her Preferred Order list, the "Work Lunch" order is displayed first, making its identification and ordering efficient and personalized.

In an embodiment extending the embodiment of FIG. 16, a Preferred Order may be created based on one or more past orders, including one or more Preferred Orders. Further, the ordering process may be simulated on a digital device, allowing a consumer to build a Preferred Order without having to actually order it first. The digital device may be a self service station, kiosk, point of sale terminal, interactive customer display, personal computer, set top box, personal digital assistant, cell phone, or the digital device of FIG. 14.

In the embodiment of FIG. 16, orders may consist of items of any type of good, product, or service. In another embodiment based on the embodiment of FIG. 16, items are food items, and the food items are provided by a restaurant such as MACDONALD'S, WENDY'S, BURGER KING, CHICK-FIL-A, KENTUCY FRIED CHICKEN, SUBWAY, HARDEE'S, ARBY'S, and POPEYES.

The food items of the current embodiment may be further defined or described using one or more modifiers. Modifiers can describe the amount or type of condiments for the associated food item, such as 'NO', 'ONLY', 'LIGHT', 'HEAVY', and 'ADD', the preparation of the associated food item such as 'RARE', 'MEDIUM', and 'WELL DONE', as well as describe the size of the associated food item, such as 'SMALL', 'MEDIUM', and 'LARGE.'

Express Item Module

The present invention facilitates consumer ordering by providing several embodiments of an Express Item. In one embodiment of the present invention, an Express Item facilitates consumer ordering by suggesting a food item to a consumer based on one or more previously ordered food items.

Figure 17:
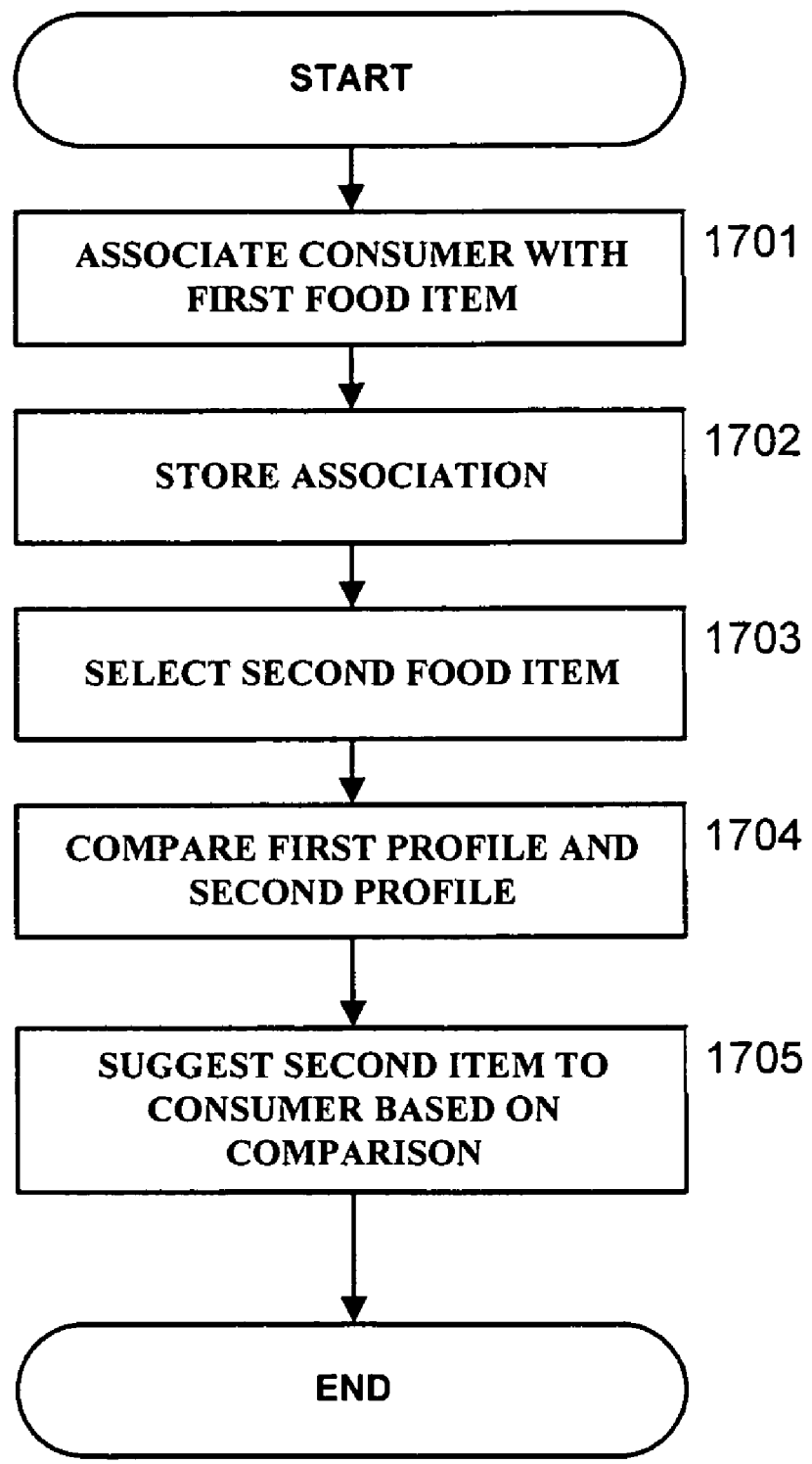
FIG. 17 illustrates a logical overview of an Express Item in one embodiment.

An Express Item is illustrated in the embodiment of FIG. 17, which is drawn to a consumer ordering food items, but one of skill in the art will appreciate that the method is equally applicable to items of any type. First, in the embodiment of FIG. 17, a consumer is associated with a first food item 1701, the first food item having a first food item profile describing the item. Second, the association between the first food item and the consumer is stored 1702. Third, a second food item is selected 1703, the second food item having a second food item profile describing the item. Fourth, the method of the current embodiment compares the first food item profile and the second food item profile 1704, to finally suggest the second food item to the consumer based on the comparison 1705. The suggestion may be determined based on rules, wherein rules include logical rules, Boolean logic rules, matching rules, weighted parameters, statistical methods, and intelligent methods. For example, if the first food item is a DIET COKE, then the current embodiment may suggest a DIET PEPSI to the consumer based on the fact that both are low calorie caffeinated soft drinks.

In another embodiment extending the embodiment of FIG. 17, the food item profile contains food item information describing the associated food item, including information such as taste, nutritional value, ingredients, preparation method, condiments, size, popularity, promotion, inventory, and cost. In a further embodiment, the association between the first food item and the consumer may be stored on a digital device, wherein digital device includes a self service station, kiosk, point of sale terminal, interactive customer display, personal computer, set top box, personal digital assistant, cell phone, and the digital device of FIG. 14.

In another embodiment based on the embodiment of FIG. 17, the food items are provided by a restaurant such as MACDONALD'S, WENDY'S, BURGER KING, CHICK-FIL-A, KENTUCY FRIED CHICKEN, SUBWAY, HARDEE'S, ARBY'S, and POPEYES.

The food items of the current embodiment may be further defined or described using one or more modifiers. Modifiers can describe the amount or type of condiments for the associated food item, such as 'NO', 'ONLY', 'LIGHT', 'HEAVY', and 'ADD', the preparation of the associated food item such as 'RARE', 'MEDIUM', and 'WELL DONE', as well as describe the size of the associated food item, such as 'SMALL', 'MEDIUM', and 'LARGE.'

Figure 9:
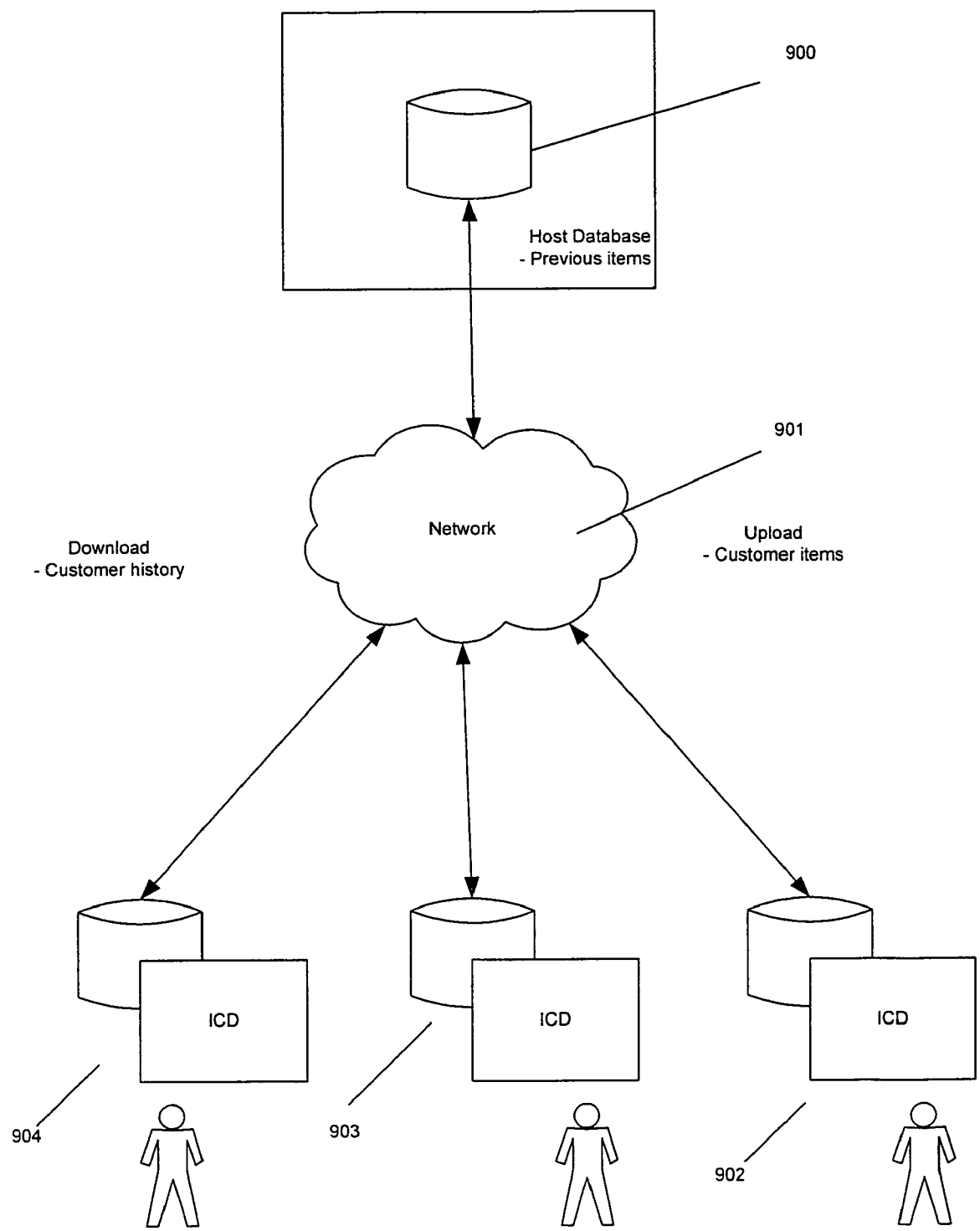
FIG. 9 is a diagram for Express Items available across multiple stores.

In another embodiment, past items may be stored and retrieved from various sources. For example, items may be retrieved from a computer system residing with the local vendor. In the embodiment of FIG. 9, past items are stored at a host database 900 and made available to all sites 902, 903, 904 in communication with the host database 900 over a network 901 such as the Internet. Vendors may be connected either through a persistent connection over the network 901 to the host database 900 or vendors may periodically connect to the host database 900 over the network 901 to retrieve the most recent item information.

In another embodiment, Express Items allow customers to use a web-based application to manage an Express Item account. For example, the customer may use a web application to manage their personal information, modify or create item profiles, define suggestion rules, and specify the payment method to be used. Additionally, customers may name each item using their own personalized name that will be displayed at order time.

The present invention has been illustrated in relation to embodiments which are intended in all respects to be illustrative rather than restrictive. Those skilled in the art will realize that the present invention is capable of many modifications and variations without departing from the scope of the invention.

We claim:

1. A method to facilitate consumer ordering, comprising the steps of:
    a. identifying a consumer, the consumer associated with one or more past food orders;
    b. retrieving one or more past food orders associated with the consumer, wherein a food order comprises one or more food items;
    c. displaying the one or more past food orders to the consumer, wherein the one or more past food orders are displayed prior to the consumer placing an order; and
    d. creating, by a processor, a current food order associated with the consumer, the current food order based on the one or more past food orders.

2. The method of claim 1, wherein the creating step further comprises:
    receiving a selection of one of the one or more past food orders, wherein the current food order comprises the selected past food order.

3. The method of claim 1, wherein the creating step further comprises:
    applying a set of rules to the one or more past food orders in order to automatically generate one or more suggested food orders; and
    receiving a selection of at least one of the one or more suggested food orders, wherein the current food order comprises the selected suggested food order.

4. The method of claim 1, wherein the creating step comprises creating a current food order associated with the consumer, the current food order based on the one or more past food orders and containing at least one food item which is not found in the one or more past food orders.

5. The method of claim 1, further comprising the step of suggesting a food item for the current food order, wherein the suggested food item is not part of the one or more past food orders associated with the consumer.

6. The method of claim 1, further comprising the step of suggesting a food item to be included in the current order.

7. The method of claim 1, further comprising the step of suggesting a food item to be included in the current order based on one or more past orders.

8. The method of claim 1, wherein the current food order differs from a past food order by one food item.

9. The method of claim 1, wherein the current food order is identical to a past food order.

10. The method of claim 1, further comprising the step of generating an order menu for the consumer based on the current food order.

11. The method of claim 10, further comprising the step of communicating the order menu to the consumer by displaying the order menu on a digital device, wherein the digital device is selected from a group consisting of a self service station, kiosk, point of sale terminal, interactive customer display, personal computer, set top box, personal digital assistant, and cell phone.

12. The method of claim 1, wherein the retrieving step comprises retrieving one or more past food orders from a computer system on a network, wherein the network is one of an intranet, the Internet, a local area network, a wide area network, a wired network, a wireless network, or combinations thereof.

13. The method of claim 1, further comprising the steps of:
a. tendering the current food order; and
b. storing the current food order as a past food order associated with the consumer.

14. The method of claim 1, wherein each food item can be further defined using one or more modifiers.

15. The method of claim 14, wherein one or more modifiers describe the amount or type of condiments for the associated food item, and wherein the one or more modifiers are selected from a group consisting of 'NO', 'ONLY', 'LIGHT', 'HEAVY', and 'ADD.'

16. The method of claim 14, wherein one or more modifiers describe the preparation of the associated food item, and wherein the one or more modifiers are selected from a group consisting of 'RARE', 'MEDIUM', and 'WELL DONE.'

17. The method of claim 14, wherein one or more modifiers describe the size of the associated food item, and wherein the one or more modifiers are selected from a group consisting of 'SMALL', 'MEDIUM', and 'LARGE.'

18. The method of claim 1, wherein identifying the consumer comprises the steps of:
a. receiving information associated with the consumer; and
b. identifying the consumer using the received information.

19. The method of claim 18, wherein the identifying step comprises the step of determining the particular consumer the information is associated with by querying a database which contains consumer information.

20. The method of claim 18, wherein the information is derived from one of a credit instrument, debit instrument, loyalty card, gift card, login and password, biometric input device, wireless access device, radio frequency identification device, or bar-coded instrument.

21. The method of claim 1, further comprising the step of displaying food order upsell information to the consumer.

22. The method of claim 1, further comprising the step of displaying promotional information to the consumer.

23. The method of claim 1, further comprising the step of displaying end of food order information to the consumer, said end of food order information comprising one or more of a thank you or instructions for picking up the current food order.

* * * * *